US008485498B2

(12) United States Patent
Takeda et al.

(10) Patent No.: US 8,485,498 B2
(45) Date of Patent: Jul. 16, 2013

(54) VALVE CONTROL APPARATUS

(75) Inventors: Tetsuma Takeda, Kariya (JP); Sadahito Fukumori, Okazaki (JP); Tetsuji Yamanaka, Obu (JP); Hiroki Shimada, Anjo (JP)

(73) Assignee: Denso Corporation, Kariya (JP)

( * ) Notice: Subject to any disclaimer, the term of this patent is extended or adjusted under 35 U.S.C. 154(b) by 232 days.

(21) Appl. No.: 13/171,910

(22) Filed: Jun. 29, 2011

(65) Prior Publication Data

US 2012/0001111 A1    Jan. 5, 2012

(30) Foreign Application Priority Data

Jun. 30, 2010 (JP) ................................. 2010-148796
Jul. 2, 2010 (JP) ................................. 2010-151833
Dec. 1, 2010 (JP) ................................. 2010-268265

(51) Int. Cl.
*F16K 31/02* (2006.01)
(52) U.S. Cl.
USPC ................. 251/129.04; 251/129.13; 251/229; 251/231; 251/279; 137/554
(58) Field of Classification Search
USPC ..................... 251/58, 129.04, 129.11–129.13, 251/129.2, 229, 231, 279, 280; 137/554
See application file for complete search history.

(56) References Cited

U.S. PATENT DOCUMENTS

| 1,961,386 | A | * | 6/1934 | Payne | 137/554 |
| 2,908,478 | A | * | 10/1959 | Starrett | 251/279 |
| 3,254,660 | A | * | 6/1966 | Ray | 137/553 |
| 3,828,808 | A | * | 8/1974 | Ortelli | 251/229 |
| 3,985,151 | A | * | 10/1976 | Smith | 137/269 |
| 4,050,670 | A | * | 9/1977 | Borg et al. | 251/229 |
| 4,527,769 | A | * | 7/1985 | Stogner et al. | 251/229 |
| 4,549,470 | A | * | 10/1985 | Yogo | 92/167 |
| 4,918,924 | A | * | 4/1990 | Kyoya et al. | 92/167 |

(Continued)

FOREIGN PATENT DOCUMENTS

| JP | S60-164624 | 8/1985 |
| JP | H04-050777 U | 4/1992 |

(Continued)

OTHER PUBLICATIONS

Japanese Office Action dated May 8, 2012, issued in corresponding Japanese Application No. 2010-151833, with English translation.

(Continued)

*Primary Examiner* — Eric Keasel
(74) *Attorney, Agent, or Firm* — Nixon & Vanderhye P.C.

(57) ABSTRACT

A rotational moving point of a connection between a rod and a valve swings between a full open point, at which the valve is fully opened, and a full close point, at which the valve is fully closed. An apex of this swing is set at a point, which is between the full close point and a half point and satisfies a relationship of $\theta P > \theta A$ where $\theta P$ denotes an angle that is defined between a first imaginary line, which connects between a bearing center of a rod bearing and the full open point, and a second imaginary line, which connects between the bearing center and the apex of the swing, and $\theta A$ denotes an angle that is defined between the first imaginary line and a third imaginary line, which connects between the bearing center and the full close point.

12 Claims, 12 Drawing Sheets

U.S. PATENT DOCUMENTS

| | | | |
|---|---|---|---|
| 4,971,288 A * | 11/1990 | Tanner et al. | 251/58 |
| 5,797,585 A * | 8/1998 | Auvity | 251/279 |
| 6,199,822 B1 * | 3/2001 | Hakansson | 251/58 |
| 6,823,854 B2 | 11/2004 | Bellon | |
| 7,161,349 B2 * | 1/2007 | Itoh et al. | 324/207.25 |
| 8,181,545 B2 | 5/2012 | Keefover et al. | |
| 2010/0319663 A1 | 12/2010 | Gracner et al. | |

FOREIGN PATENT DOCUMENTS

| | | |
|---|---|---|
| JP | H05-288065 | 11/1993 |
| JP | H06-043305 U | 6/1994 |
| JP | H09-137876 | 5/1997 |
| JP | 10-103069 | 4/1998 |
| JP | H11-030352 | 2/1999 |
| JP | 2004-177398 | 6/2004 |
| JP | 2010-90766 | 4/2010 |

OTHER PUBLICATIONS

Office Action (5 pages) dated Jan. 16, 2013, issued in corresponding Chinese Application No. 201110185821.3 and English translation (5 pages).

Shimada et al, U.S. Appl. No. 13/173,401, filed Jun. 30, 2011.

* cited by examiner

VALVE CLOSE

VALVE OPEN

EXHAUST GAS

EXHAUST GAS

VALVE CLOSE

VALVE OPEN

AMOUNT δ OF SWING OF ROD

MOVABLE RANGE OF LINK LEVER

VALVE CLOSE

VALVE OPEN

AMOUNT $\delta$ OF SWING OF ROD

MOVABLE RANGE OF LINK LEVER

VALVE CONTROL APPARATUS

CROSS REFERENCE TO RELATED APPLICATION

This application is based on and incorporates herein by reference Japanese Patent Application No. 2010-148796 filed on Jun. 30, 2010, Japanese Patent Application No. 2010-151833 filed on Jul. 2, 2010 and Japanese Patent Application No. 2010-268265 filed on Dec. 1, 2010.

BACKGROUND OF THE INVENTION

1. Field of the Invention

The present invention relates to a valve control apparatus.

2. Description of Related Art

For example, Japanese Unexamined Patent Publication No. H10-103069A teaches a boost pressure control apparatus, which includes a wastegate valve that opens or closes a wastegate passage of a turbocharger.

As shown in FIGS. 8 to 10B, the boost pressure control apparatus of Japanese Unexamined Patent Publication No. H10-103069A includes a rotatable shaft 102, which supports and drives the wastegate valve 101. A link lever 103 is connected to the rotatable shaft 102, and a rod 105 of a diaphragm actuator 104 is connected to the link lever 103. A valve seat 107 is formed at a wastegate passage 106, and the wastegate valve 101 is seatable against the valve seat 107.

An arrow shown in FIG. 9B indicates a movable range (operational angle) of the link lever 103.

Furthermore, Japanese Unexamined Patent Publication No. 2010-90766A teaches a diaphragm actuator, which drives an exhaust gas bypass valve that opens or closes an exhaust gas bypass passage of a turbocharger.

As shown in FIGS. 11 to 13B, the diaphragm actuator 204 of Japanese Unexamined Patent Publication No. 2010-90766A has a rotatable shaft 202, which supports and drives the exhaust gas bypass valve 201. A link lever 203 is connected to the rotatable shaft 202, and a rod 205 of the diaphragm actuator 204 is connected to the link lever 203. Also, a valve seat 207 is provided at the exhaust gas bypass passage 206, and the exhaust gas bypass valve 201 is seatable against the valve seat 207.

An arrow shown in FIG. 12B indicates a movable range (operational angle) of the link lever 203.

Lately, in many countries, it is mandatory to install an on-board diagnostic (OBD) system for the exhaust gas on the vehicle due to the enhancement of the regulation with respect to the exhaust gas of the engine installed on the vehicle.

Here, in the case where the diaphragm actuator 104, 204 of Japanese Unexamined Patent Publication No. H10-103069A or of Japanese Unexamined Patent Publication No. 2010-90766A is used as the actuator, which controls opening and closing of the wastegate valve 101 or of the exhaust gas bypass valve 201, it is necessary to directly sense the amount of the stroke of the rod 105, 205, as specified by the OBD requirement.

It is conceivable to install a magnetic circuit, which is formed by a magnet(s) and a yoke, to the rod 105, 205. In such a case, a density of a magnetic flux of a magnetic field applied from the magnetic circuit may be sensed with a magnetic sensor. Then, the amount of the stroke of the rod 105, 205 may be obtained based on an electric signal, which is outputted from the magnetic sensor.

In the boost pressure control apparatus recited in Japanese Unexamined Patent Publication No. H10-103069A, the movable range of the link lever 103, which connects between the rotatable shaft 102 of the wastegate valve 101 and the rod 105 of the diaphragm actuator 104, is not clearly taught, and movement of the link lever 103 results in swing motion of the rod 105.

Specifically, when the wastegate valve 101 is driven in an operational range between a full close position (see FIG. 9A) and a full open position (see FIG. 9B), i.e., when a connection 108 between the link lever 103 and the rod 105 is moved along a rotational path (rotational moving path of the link lever 103), which is a curved path having a predetermined radius of curvature about the rotatable shaft 102, the rod 105 is swung by the amount δ (the amount of swing of the rod 105).

Therefore, in the case where the amount of the stroke of the rod 105 is directly sensed with the magnetic sensor, a sensing error may be disadvantageously increased due to the swing motion of the rod 105.

Furthermore, in the boost pressure control apparatus of Japanese Unexamined Patent Publication No. H10-103069A, as indicated in FIG. 10A, a rate of change in the flow quantity of the exhaust gas relative to a change in the amount of displacement of the rod 105 is relatively large in a range located on a full close degree side of a half degree, which is an opening degree of the wastegate valve 101 between the full close degree and a full open degree. In contrast, a rate of the change in the flow quantity of the exhaust gas relative to the change in the amount of displacement of the rod 105 is relatively small in a range located on a full open degree side of the half degree of the wastegate valve 101.

Furthermore, as shown in FIG. 10B, a rate of the change in the amount δ of the swing of rod 105 is relatively small in the entire range from the full close degree to the full open degree of the wastegate valve 101 through the half degree.

Therefore, it is required to improve the sensing accuracy of the amount of the stroke of the rod 105 by reducing the amount of the swing of the rod 105 in the low opening degree range where the rate of the change in the flow quantity of the exhaust gas relative to the change in the amount of the displacement of the rod 105 is largest.

In the diaphragm actuator 204 of Japanese Unexamined Patent Publication No, 2010-90766A, the disadvantage, which is similar to that of the actuator 104 of Japanese Unexamined Patent Publication No. H10-103069A, occurs although a rotation start angle of the link lever 203 differs from that of the actuator 104 of Japanese Unexamined Patent Publication No. H10-103069A, as shown in FIG. 12A.

Specifically, when the exhaust gas bypass valve 201 is driven in an operational range between a full close position (see FIG. 12A) and a full open position (see FIG. 12B), i.e., when a connection 208 between the link lever 203 and the rod 205 is moved along a rotational path (rotational moving path of the link lever 203), which is a curved path having a predetermined radius of curvature about the rotatable shaft 202, the rod 205 is swung by the amount 6 (the amount of swing of the rod 205).

Therefore, in the case where the amount of the stroke of the rod 205 is directly sensed with the magnetic sensor, a sensing error may be disadvantageously increased due to the swing motion of the rod 205.

Furthermore, in the diaphragm actuator 204 of Japanese Unexamined Patent Publication No. 2010-90766A, as indicated in FIG. 13A, a rate of change in the flow quantity of the exhaust gas relative to a change in the amount of displacement of the rod 205 is relatively large in a range located on a full close degree side of a half degree, which is an opening degree of the exhaust gas bypass valve 201 between the full close degree and a full open degree. In contrast, a rate of the change in the flow quantity of the exhaust gas relative to the change in the amount of displacement of the rod 205 is relatively small in a range located on a full open degree side of the half degree of the exhaust gas bypass valve 201.

Furthermore, as shown in FIG. 13B, a rate of the change in the amount δ of the swing of rod 205 is relatively small in the entire range from the full close degree to the full open degree of the exhaust gas bypass valve 201 through the half degree.

Therefore, it is required to improve the sensing accuracy of the amount of the stroke of the rod 205 by reducing the amount of the swing of the rod 205 in the low opening degree range where the rate of the change in the flow quantity of the exhaust gas relative to the change in the amount of the displacement of the rod 205 is largest.

Furthermore, in the boost pressure control apparatus of Japanese Unexamined Patent Publication No. H10-103069A and the diaphragm actuator 204 of Japanese Unexamined Patent Publication No. 2010-90766A, if a rod bearing, which slidably supports the rod 105, 205 to enable slide movement of the rod 105, 205 in the axial direction thereof, is provided, there occur some disadvantageous incidents, such as an incident of applying of a large force to the rod bearing, an incident of grinding of the rod 105, 205 against the inner peripheral part of the rod bearing, an incident of localized wearing at the connection between the rod 105, 205 and the rod bearing, and an incident of encountering an operational failure of the rod 105, 205.

SUMMARY OF THE INVENTION

The present invention addresses the above disadvantages. According to the present invention, there is provided a valve control apparatus, which includes a valve, an actuator having a rod, a link mechanism, and means (hereinafter, referred to as sensing means) for sensing an amount of displacement of the rod in the axial direction of the rod. The valve is adapted to open or close a flow passage. The actuator includes a rod and a rod bearing and drives the rod to reciprocate the rod and to drive the valve through the rod. The rod bearing slidably supports the rod to enable slide motion of the rod in an axial direction while enabling swing motion of the rod about a bearing center of the rod bearing. The link mechanism includes a lever, which connects between the valve and the rod and converts linear motion of the rod into rotational motion of the valve. The actuator is driven to control opening and closing of the valve based on the amount of displacement of the rod in the axial direction of the rod, which is sensed by the sensing means. The lever includes a rotational axis, which is coaxial with a rotational axis of the valve, at a valve-side connection of the lever that is rotatably connected to the valve. The lever includes a rod-side connection that is rotatably connected to the rod. A rotational moving point of the rod-side connection is adapted to swing between a full close point and a full open point along a rotational moving path, which is a curved path centered at the rotational axis of the valve-side connection of the lever and has a predetermined radius of curvature. When an opening degree of the valve becomes a full close degree to fully close the flow passage, the rotational moving point of the rod-side connection, which is moved along the rotational moving path, is placed in the full close point along the rotational moving path. When the opening degree of the valve becomes a full open degree to fully open the flow passage, the rotational moving point of the rod-side connection, which moves along the rotational moving path, is placed in the full open point along the rotational moving path. When the opening degree of the valve becomes a half degree, which is one half of an angular degree between the full close degree and the full open degree, the rotational moving point of the rod-side connection is placed in a half point between the full close point and the full open point along the rotational moving path. An apex of swing of the rotational moving point of the rod-side connection, which is adapted to swing between the full close point and the full open point along the rotational moving path, is set at a point, which is located between the full close point and the half point along the rotational moving path and satisfies a relationship of θP>θA. Here, θP denotes an angle that is defined between a first imaginary line (straight line), which connects between the bearing center and the full open point, and a second imaginary line (straight line), which connects between the bearing center and the apex of the swing, and θA denotes an angle that is defined between the first imaginary line and a third imaginary line (straight line), which connects between the bearing center and the full close point.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
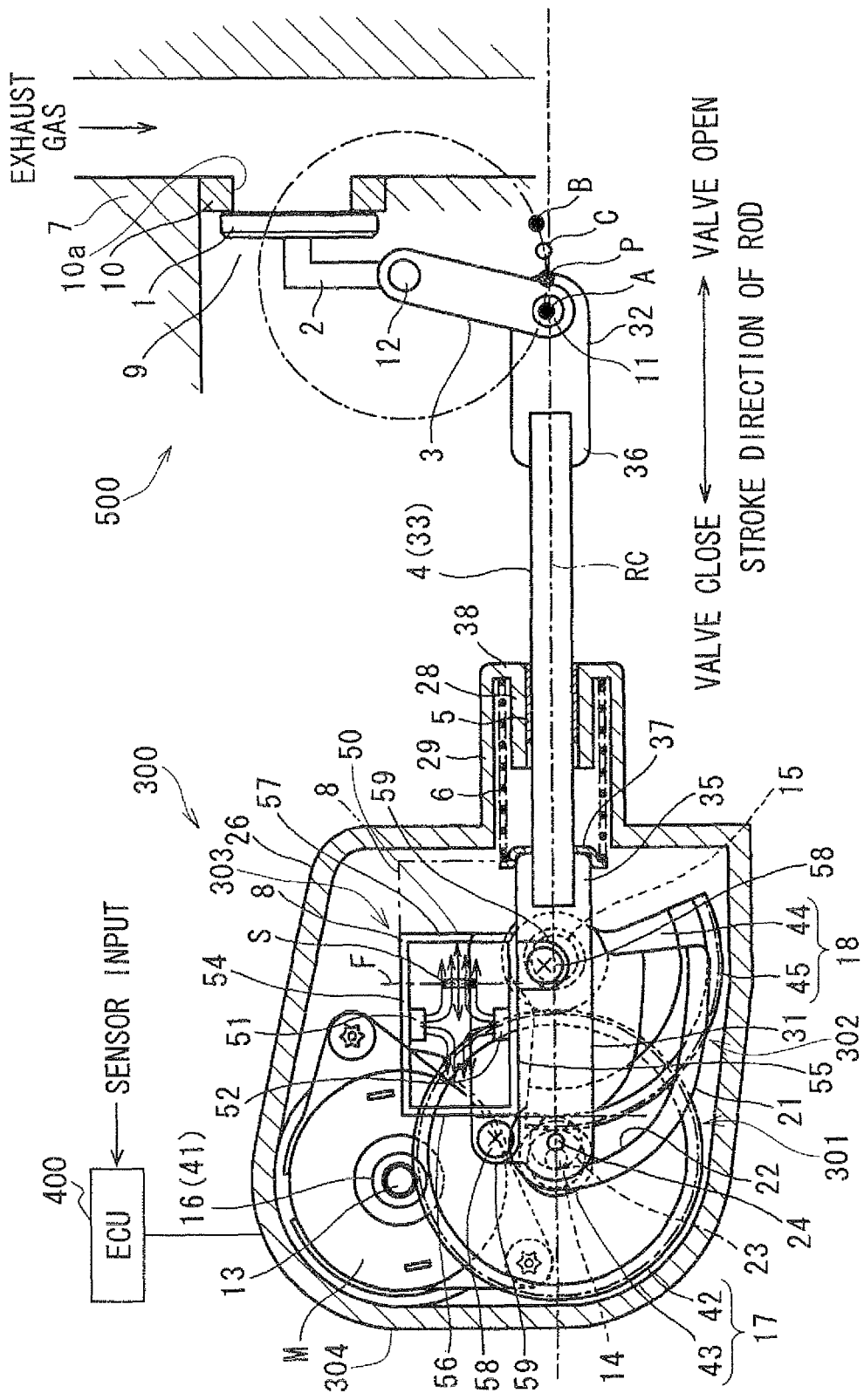
FIG. 1 is a descriptive view showing a wastegate valve control apparatus according to an embodiment of the present invention.
Figure 2:
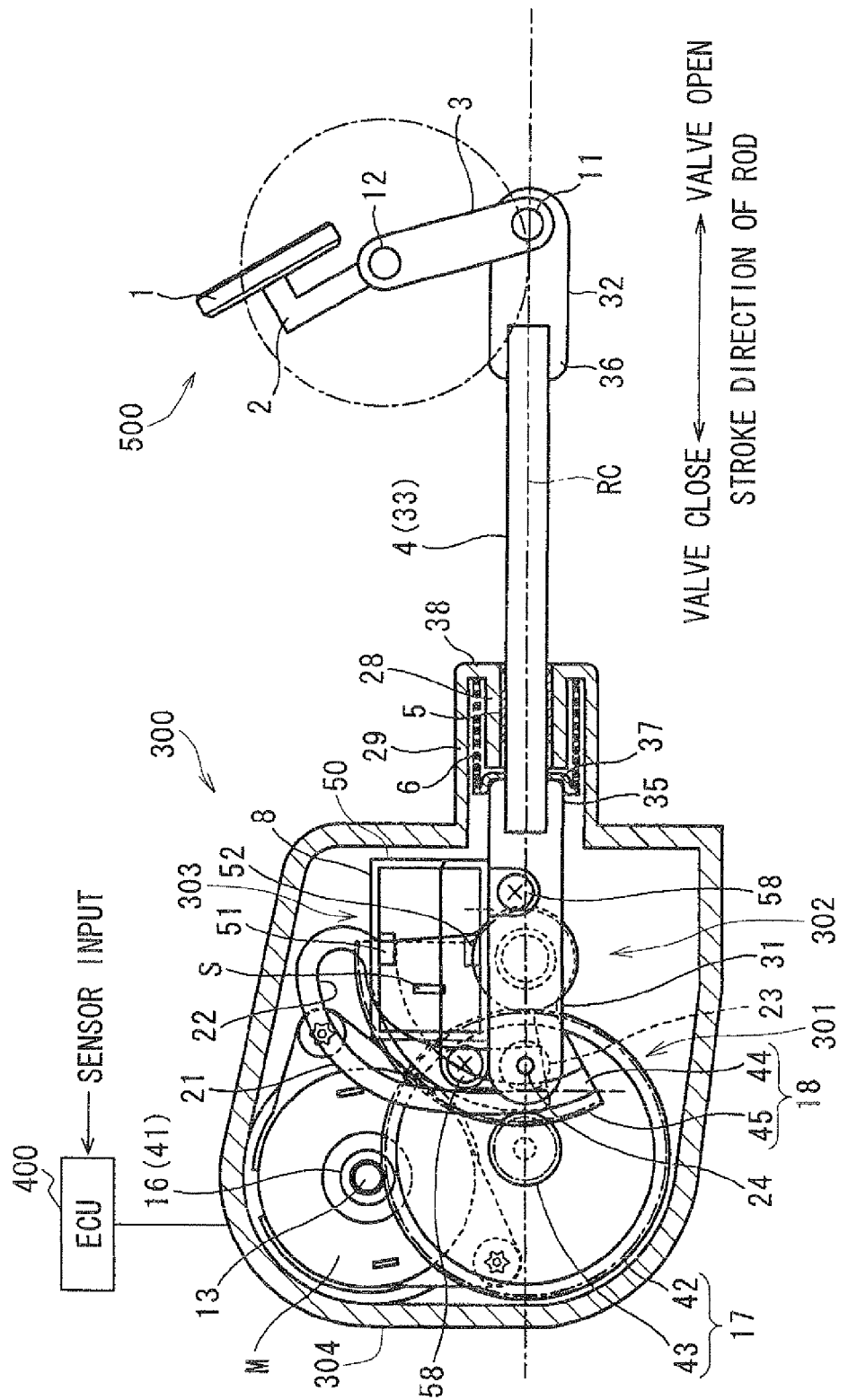
FIG. 2 is a descriptive view showing the wastegate valve control apparatus according to the embodiment.
Figure 3:
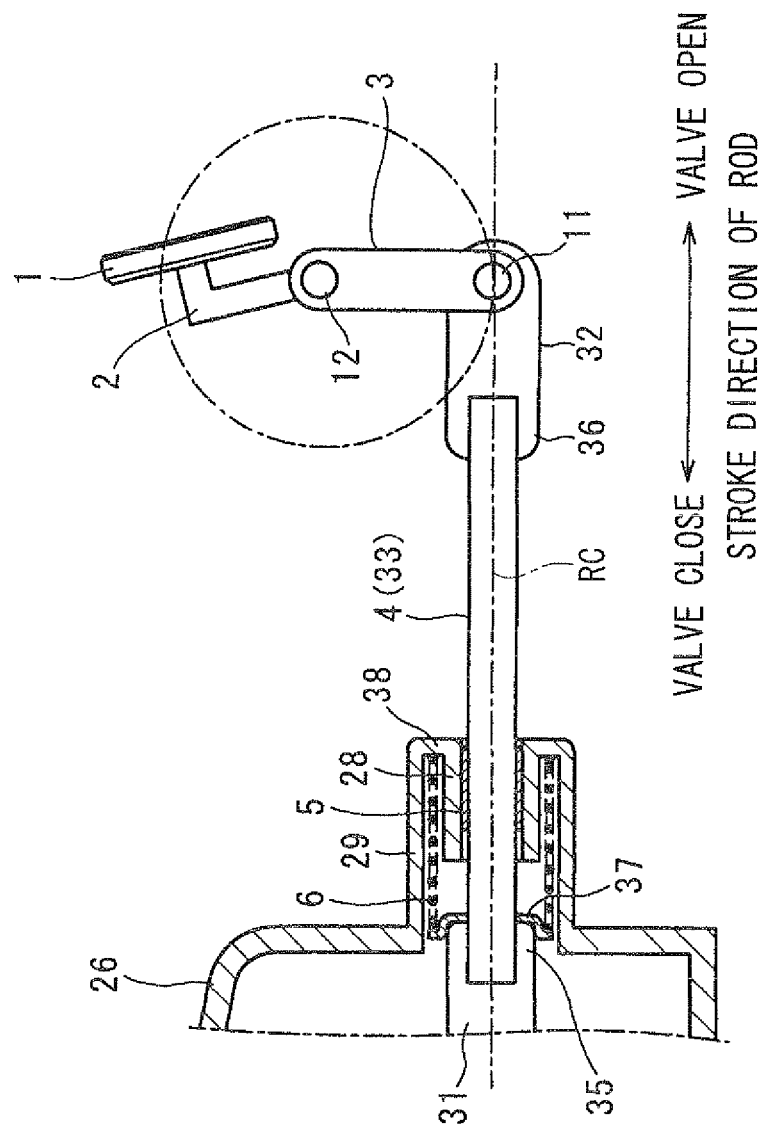
FIG. 3 is a descriptive view showing an apex of swing of a link lever according to the embodiment.

Now, an embodiment of the present invention will be described. FIGS. 1 to 7B show an embodiment of the present invention. Specifically, FIG. 1 shows a positional relationship between a link lever and a rod at the time of fully closing a wastegate valve. FIG. 2 shows a positional relationship between the link lever and the rod at the time of fully opening the wastegate valve.

A wastegate valve control apparatus of an internal combustion engine of the present embodiment is implemented in a boost pressure control apparatus of the internal combustion engine. The wastegate valve control apparatus includes a wastegate valve 1, a link mechanism 500, an electric actuator 300 and an engine control unit (ECU) 400. The wastegate valve 1 controls a flow quantity of exhaust gas of the internal combustion engine. The link mechanism 500 includes a link lever 3, which is connected to a shaft 2 of the wastegate valve 1. The electric actuator 300 includes a rod 4, which is connected to the wastegate valve 1 through the link lever 3 to drive the wastegate valve 1. The ECU 400 variably controls the boost pressure of the internal combustion engine by controlling the opening and closing of the wastegate valve 1 based on an operational state of the internal combustion engine.

The wastegate valve 1 is a valve element of an exhaust gas flow quantity control valve, which controls the flow quantity of exhaust gas that flows through a wastegate passage (flow passage) 9 of the turbocharger installed to the engine. During an engine operation period, the wastegate valve 1 is rotated, i.e., pivoted within a valve operational range between a full close position and a full open position of the wastegate valve 1 based on a control signal outputted from the ECU 400 to change a size of an open area of the wastegate passage 9 (an exhaust gas passage cross-sectional area).

The shaft 2, which is configured into an L-shape, is provided integrally with the wastegate valve 1 at a rear surface of the wastegate valve 1 (a surface of the wastegate valve 1, which is opposite from a seat surface of the wastegate valve 1 that is seatable against a valve seat 10 of the wastegate passage 9). Details of the wastegate valve 1 will be described later.

The electric actuator 300 controls the opening and closing of the wastegate valve 1 in response to the amount of displacement (the amount of stroke) of the rod 4 in a stroke direction (also referred to as an axial direction or a load application direction) of the rod 4.

Besides the rod 4, which is adapted to reciprocate in the axial direction of the rod 4, the electric actuator 300 further includes a thrust bearing (rod bearing) 5, a coil spring 6 and an actuator case 304. The thrust bearing 5 supports the rod 4 in such a manner that the rod 4 is slidable in a reciprocating direction of the rod 4 (the stroke direction of the rod 4, i.e., the axial direction of the rod 4) and is swingable (tiltable) in a top-to-bottom direction in FIG. 1. The coil spring 6 exerts an urging force (spring load) to the rod 4 to urge the wastegate valve 1 in a closing direction (valve full close side). The actuator case 304 receives the components, such as the thrust bearing 5 and the coil spring 6. A distal end side of the rod 4 of the electric actuator 300 in the stroke direction thereof projects to an outside of the actuator case 304 from an annular end surface of the actuator case 304. Details of the electric actuator 300 will be described later.

In the present embodiment, the engine is a multi-cylinder diesel engine having a plurality of cylinders. An intake pipe is connected to intake ports of the cylinders of the engine to guide the intake air to the intake ports. A compressor of a turbocharger, an intercooler, a throttle valve and an intake manifold are installed in the intake pipe.

Furthermore, an exhaust pipe is connected to exhaust ports of the cylinders of the engine to guide exhaust gas from the cylinders. An exhaust manifold and a turbine of the turbocharger are installed in the exhaust pipe.

The turbocharger is a turbosupercharger that includes the turbine and the compressor. The intake air is compressed through the compressor and is then supplied to a combustion chamber of each of the cylinders of the engine.

The turbine includes a turbine housing 7, which is configured into a spiral form. A turbine impeller (turbine wheel) is placed in the turbine housing 7.

The compressor includes a compressor housing, which is configured into a spiral form. A compressor impeller (compressor wheel) is placed in the compressor housing.

The turbine impeller and the compressor impeller are connected with each other through a rotor shaft to rotate together.

In the turbocharger, when the turbine impeller is rotated by the exhaust gas, the compressor impeller is also rotated to compress the intake air.

Here, the turbine housing 7 of the turbocharger of the present embodiment is provided with the wastegate passage 9 and the wastegate valve 1.

The wastegate passage 9 is a bypass passage (fluid passage) that bypasses the turbine impeller to guide the exhaust gas, which is guided into the turbine housing 7, to a portion of the exhaust passage located on the downstream side of the turbine impeller without passing through the turbine impeller.

Alternatively, the wastegate passage 9 may be another bypass passage (fluid passage). Specifically, the wastegate passage 9 may be branched off from a portion of the exhaust passage, which is located on a downstream side of a collection point of the exhaust manifold (point where branches of the exhaust manifold merge with each other), then the wastegate passage 9 may merge to a portion of the exhaust passage, which is located on a downstream side of the turbine of the turbocharger. That is, the wastegate passage 9 may be the bypass passage (fluid passage) that bypasses the turbine housing 7 to conduct the exhaust gas without passing through the turbine housing 7.

The wastegate passage 9 of the present embodiment communicates between an upstream side communication hole (wastegate port), which opens at a partition wall of the inlet of the turbine housing 7, and a downstream side communication hole, which opens at a partition wall of the outlet of the turbine housing 7. The valve seat 10 is provided in the wastegate passage 9, and the wastegate valve 1 is seatable against the valve seat 10. The valve seat 10 defines an opening 10a therein to conduct the exhaust gas therethrough upon opening of the wastegate valve 1, i.e., upon lifting of the wastegate valve 1 from the valve seat 10.

The wastegate valve 1 is made of a metal material (e.g., stainless steel) and is configured into a circular disk form. The wastegate valve 1 is an exhaust gas control valve, which is connected to the distal end part of the rod 4 of the electric actuator 300 such that the wastegate valve 1 is adapted to be seated against or be lifted away from the partition wall (valve seat 10) of the inlet of the turbine housing 7 to close or open the wastegate passage 9, particularly the wastegate port.

The link mechanism 500 is placed between the shaft 2 of the wastegate valve 1 and the rod 4 of the electric actuator 300 to convert linear motion of the rod 4 into rotational motion of the wastegate valve 1.

As shown in FIGS. 1 and 2, the link mechanism 500 includes the link lever 3. One end part of the link lever 3 is connected to the distal end part of the rod 4 (i.e., the end part of the rod 4 located distally in the stroke direction, i.e., the reciprocating direction of the rod 4), and the other end part of the link lever 3 is connected to the distal end part of the shaft 2 of the wastegate valve 1 (i.e., the end part of the shaft 2 opposite from the wastegate valve 1 side end part of the shaft 2).

A first hinge pin (first support shaft serving as a rod-side connection) 11 is fixed to (or is formed integrally with) the distal end part of the rod 4. The first hinge pin 11 is inserted from a rear surface side of the rod 4 and projects from a front surface side of the rod 4. A second hinge pin (second support shaft serving as a valve-side connection) 12 is formed integrally with (or is fixed to) the shaft 2 of the wastegate valve 1. The second hinge pin 12 projects in the same direction as that of the first hinge pin 11.

The link lever 3 includes a first connection (rod-side connection), which is connected to the distal end part of the rod 4 that is distal in the stroke direction of the rod 4, and a second connection (valve-side connection), which is connected to the shaft 2 of the wastegate valve 1.

The first connection of the link lever 3 has a through-hole, through which the first hinge pin 11 is received. Furthermore, the first connection of the link lever 3 is rotatably supported by the outer peripheral portion of the first hinge pin 11.

The second connection of the link lever 3 has a through-hole, through which the second hinge pin 12 is received. Furthermore, the second connection is fixed to the second hinge pin 12.

Details of the link mechanism 500, particularly of the link lever 3 will be described later.

The first hinge pin 11 rotatably supports the wastegate valve 1, the shaft 2 and the link lever 3. The shaft 2 is bent at a right angle into an L-shape, and the second hinge pin 12 is fixed to the end part of the shaft 2, which is located on the electric actuator 300 side. The second hinge pin 12 is rotatably supported by a side wall portion of the turbine housing 7 of the turbocharger. A rotational center (rotational axis) of the second hinge pin 12 is the rotational center (rotational axis) of the wastegate valve 1.

Therefore, the wastegate valve 1 serves as a hinged valve, which is connected to the distal end part of the rod 4 (i.e., the distal end part in the stroke direction of the rod 4) through the first hinge pin 11, the link lever 3 and the second hinge pin 12.

Next, details of the electric actuator 300 of the present embodiment will be described with reference to FIGS. 1 and 2.

The electric actuator 300 includes the rod 4, the thrust bearing 5, the coil spring 6, an electric motor M, a speed reducing mechanism 301, a converting mechanism 302, a stroke sensing device 303 (a magnetic movable body 8 and a stroke sensor S described later) and the actuator case 304. The stroke sensing device 303 and the ECU 400 serve as a sensing means. The electric motor M generates a drive force (motor torque) when the electric motor M receives an electric power and is thereby rotated. The speed reducing mechanism 301 reduces a rotational speed of the rotation, which is transmitted from the electric motor M, through two stages. The converting mechanism 302 converts the rotational motion of the speed reducing mechanism 301 into linear reciprocating motion of the rod 4. The stroke sensing device 303 senses a stroke position of the rod 4 of the electric actuator 300 (i.e., a position of the rod 4 along its stroke path). The actuator case 304 receives the above components of the electric actuator 300.

The speed reducing mechanism 301 includes three speed reducing gears 16-18. Specifically, the speed reducing mechanism 301 includes a motor shaft (a rotational shaft or an output shaft) 13 of the electric motor M, an intermediate gear shaft (first support shaft) 14, a final gear shaft (second support shaft) 15, a pinion gear (a motor gear) 16, an intermediate gear (a driving-side gear or a first gear) 17 and a final gear (a driven-side gear, a second gear or a spur gear) 18. The intermediate gear shaft 14 and the final gear shaft 15 are arranged parallel to the motor shaft 13. The pinion gear 16 is fixed to the motor shaft 13. The intermediate gear 17 is meshed with and is driven together with the pinion gear 16. The final gear 18 is meshed with and is driven together with the intermediate gear 17.

The converting mechanism 302 includes a plate cam 21, a follower 23 and a pivot pin (support shaft) 24. The plate cam 21 is rotatably supported. The follower 23 is movably received (slidably received) in a cam groove 22 of the plate cam 21. The pivot pin 24 rotatably supports the follower 23.

The actuator case 304 of the electric actuator 300 includes a gear housing 26 and a sensor cover. The gear housing 26 receives the electric motor M and rotatably supports the speed reducing mechanism 301 and the converting mechanism 302 therein. The sensor cover covers an opening of the gear housing 26.

The gear housing 26 is made of a non-magnetic metal material, such as stainless steel. The sensor cover is made of a non-magnetic material, such as a resin material having an excellent dielectric property.

A bearing holder 28 is configured into a cylindrical tubular form and is located on a valve side (wastegate valve 1 side) of a side wall of the gear housing 26, and a bearing hole extends through the bearing holder 28 in the axial direction of the rod 4. The thrust bearing 5 is press-fitted to a hole wall surface of the bearing hole of the bearing holder 28. A spring holder 29 is configured into a cylindrical tubular form and projects from the side wall of the gear housing 26 toward the valve side (wastegate valve 1 side), and the coil spring 6 is received in the spring holder 29.

The rod 4 of the electric actuator 300 linearly extends in the stroke direction, which is the same as the direction of a central axis RC of the rod 4. The rod 4 includes a first rod 31, a second rod 32 and a connecting rod 33. The first rod 31 is configured into a plate form (planar form) and is connected to the plate cam 21 through the follower 23 and the pivot pin 24. The second rod 32 is configured into a plate from (planar form) and is connected to the shaft 2 of the wastegate valve 1 through the link mechanism 500 (e.g., the link lever 3). The connecting rod 33 is configured to have a circular cross section and connects between the first rod 31 and the second rod 32. The first rod 31, the second rod 32 and the connecting rod 33 are made of a metal material (non-magnetic material), such as stainless steel, and are joined together by, for example, welding to form a single-piece component.

The first rod 31 is an input portion, which receives a load from the plate cam 21 through the follower 23 and the pivot pin 24. A surface of the first rod 31 forms a magnetic movable body mount surface, to which the magnetic movable body 8 is fixed by, for example, screws. The magnetic movable body 8 may be fixed to the first rod 31 by resin molding.

A fitting hole is formed in one end part of the first rod 31, which is opposite from the connecting rod 33, and the pivot pin 24 is fitted into the fitting hole. The pivot pin 24 is securely connected to, i.e., is fixed to the first rod 31 such that the pivot pin 24 is inserted from a rear surface side of the first rod 31 and protrudes from a front surface side of the first rod 31.

A first connection 35 is formed at the other end part of the first rod 31 and is connected to one end part of the connecting rod 33 by welding.

The second rod 32 is an output portion, which applies a load to the wastegate valve 1 through the link lever 3 and the first and second hinge pins 11, 12. A second connection 36 is formed in one end part of the second rod 32, which is adjacent to the connecting rod 33, and the second connection 36 is connected to the other end part of the connecting rod 33 by, for example, welding.

A fitting hole (not shown) is formed in the other end part of the second rod 32, which is opposite from the connecting rod 33, and the first hinge pin 11 is fitted into this fitting hole. The first hinge pin 11 is securely connected to, i.e., is fixed to the second rod 32 such that the first hinge pin 11 is inserted from a rear surface side of the second rod 32 and protrudes from a front surface side of the second rod 32.

The connecting rod 33 is a junction, which connects between the first connection 35 of the first rod 31 and the second connection 36 of the second rod 32. A spring seat 37, which is configured into an annular form (an annular flange form), is installed to an outer peripheral surface of the end part of the connecting rod 33, which is adjacent to the first rod 31. The spring seat 37 is a load receiving portion, which receives a load of the coil spring 6 exerted toward the valve full close side (left side in FIG. 1 or 2) in the stroke direction. Furthermore, the connecting rod 33 is swingable about a bearing center OC of the thrust bearing 5 and is slidable in the axial direction of the thrust bearing 5. The spring seat 37 is engaged to an end surface of the first connection 35 of the first rod 31 of the rod 4.

The thrust bearing 5 slidably supports the connecting rod 33 in such a manner that the connecting rod 33 is slidable in the stroke direction (reciprocating direction) thereof. A through-hole (slide hole) is formed in an inside of the thrust bearing 5 to extend through the thrust bearing 5 in the axial direction of the rod 4. In a longitudinal cross-sectional view, an inner peripheral surface of the thrust bearing 5 (a slide surface, along which the connecting rod 33 of the rod 4 slides) forms a curved convex surface, which protrudes toward the central axis RC of the rod 4, at the bearing center OC of the thrust bearing 5. In other words, the inner peripheral surface of the thrust bearing 5 is curved such that an inner diameter of the thrust bearing 5 progressively increases from an axial center part of the thrust bearing 5 toward each of first and second axial end parts of the thrust bearing 5 in the axial direction. In this way, the swing motion (swing motion) of the connecting rod 33 is permitted.

The coil spring 6 serves as a rod (valve) urging means for generating an urging force (load) to urge the rod 4 toward the valve full close side (the side, at which the wastegate valve 1 is fully closed, i.e., the left side in FIG. 1 or 2) in the axial direction of the central axis RC of the rod 4. One end part of the coil spring 6 is held by the spring seat 37, and the other end part of the coil spring 6 is held by an annular partition wall (closure wall) 38, which connects between the end part of the bearing holder 28 and the end part of the spring holder 29.

In this way, the rod 4 of the electric actuator 300, particularly the first rod 31 receives the spring load of the coil spring 6 (load of the coil spring 6, which urges the rod 4 toward the valve full close side).

The speed reducing mechanism 301 forms a drive force transmitting mechanism, which transmits the torque of the electric motor M to the converting mechanism 302. The speed reducing mechanism 301 includes the intermediate gear shaft 14, the final gear shaft 15, the pinion gear 16, the intermediate gear 17 and the final gear 18, as discussed above.

The intermediate gear shaft 14 and the final gear shaft 15 are arranged generally parallel to each other. Furthermore, the three gears 16-18 are rotatably received in a speed reducing gear receiving space of the gear housing 26.

The intermediate gear shaft 14 is press-fitted into the fitting hole (fitting portion) of the gear housing 26. A central axis of the intermediate gear shaft 14 forms a rotational center (rotational axis) of the intermediate gear 17. The intermediate gear 17 is rotatably supported by an outer peripheral surface of the intermediate gear shaft 14 through two bearings (not shown). Alternatively, the two bearings may be eliminated, if desired.

A circumferential groove, which is in an annular form, is formed in an outer peripheral surface of a projecting part of the intermediate gear shaft 14, which projects from an end surface of the intermediate gear 17. An intermediate gear removal limiting means, such as a washer or a C-ring, which limits unintentional removal of the intermediate gear 17 from the intermediate gear shaft 14 upon the fitting of the intermediate gear 17 to the outer peripheral surface of the intermediate gear shaft 14, is installed to the circumferential groove.

The final gear shaft 15 is securely press-fitted into a fitting hole of the gear housing 26 and is thereby securely press-fitted to a fitting portion, which is configured into a cylindrical tubular form. A central axis of the final gear shaft 15 forms a rotational center (rotational axis) of the final gear 18. The final gear 18 is rotatably supported by an outer peripheral surface of the final gear shaft 15 through two bearings. Alternatively, the two bearings may be eliminated, if desired.

A circumferential groove, which is in an annular form, is formed in an outer peripheral surface of a projecting part of the final gear shaft 15, which projects from an end surface of the final gear 18. A final gear removal limiting means, such as a washer or a C-ring, which limits unintentional removal of the final gear 18 from the final gear shaft 15 upon the fitting of the final gear 18 to the outer peripheral surface of the final gear shaft 15, is installed to the circumferential groove.

The pinion gear 16 is made of a metal material or a resin material. The pinion gear 16 is securely press-fitted to an outer peripheral surface of the motor shaft 13. The pinion gear 16 includes a plurality of projecting teeth (pinion gear portion having the teeth) 41, which are arranged one after another in a circumferential direction along an outer peripheral surface of the pinion gear 16 and are meshed with the intermediate gear 17.

The intermediate gear 17 is made of a metal material or a resin material and is rotatably fitted to an outer peripheral surface of the intermediate gear shaft 14. The intermediate gear 17 includes a cylindrical tubular portion, which is placed to surround an outer peripheral surface of the intermediate gear shaft 14. A largest diameter portion (large diameter portion), which is configured into an annular form, is formed integrally in an outer peripheral surface of the cylindrical tubular portion.

The large diameter portion of the intermediate gear 17 includes a plurality of projecting teeth (a large diameter gear portion having the teeth) 42, which are arranged one after another in a circumferential direction along an outer peripheral surface of the large diameter portion of the intermediate gear 17 and are meshed with the projecting teeth 41 of the pinion gear 16. A cylindrical tubular portion (a small diameter portion) of the intermediate gear 17 includes a plurality of projecting teeth (small diameter gear portion having the teeth) 43, which are arranged one after another in a circumferential direction along an outer peripheral surface of the cylindrical tubular portion (the small diameter portion).

The final gear 18 is made of a metal material or a resin material and is rotatably fitted to an outer peripheral surface of the final gear shaft 15 through the bearings. The final gear 18 includes a cylindrical tubular portion, which is placed to surround an outer peripheral surface of the final gear shaft 15 in a circumferential direction. The cylindrical tubular portion of the final gear 18 includes a flange 44, which is configured into a sector shape (fan shape) and radially outwardly projects from an outer peripheral surface of the cylindrical tubular portion of the final gear 18.

The flange 44 of the final gear 18 includes a plurality of projecting teeth (large diameter sector gear portion having the teeth) 45, which are arranged one after another in a circumferential direction along an outer peripheral surface of the flange 44 of the final gear 18 through a predetermined angular range. The projecting teeth 45 of the flange 44 of the final gear 18 are meshed with the projecting teeth 43 of the intermediate gear 17.

The converting mechanism 302 is a motion direction converting mechanism, which converts rotational motion of the final gear 18 into linear motion of the rod 4. The converting mechanism 302 includes the plate cam 21, the follower 23 and the pivot pin 24. The plate cam 21 is rotated integrally with the final gear 18 about the final gear shaft 15 of the final gear 18. The follower 23 is movably received (slidably received) in the cam groove 22 of the plate cam 21. The pivot pin 24 rotatably supports the follower 23.

The plate cam 21 is made of a metal material and is configured into a predetermined shape. The plate cam 21 is fixed to a cam installation portion of the final gear 18. In a case where the final gear 18 is made of a resin material, the plate cam 21 is insert-molded into the final gear 18. In a case where the final gear 18 is made of a metal material, the final gear 18 and the plate cam 21 may be formed together from sintered metal. In this way, the rotational axis of the final gear 18 coincides with the rotational axis of the plate cam 21, and thereby the rotational center of the final gear 18 (rotational center of the final gear shaft 15) coincides with the rotational center of the plate cam 21. Furthermore, an operational angle of the final gear 18 (a final gear operational angle) becomes the same as a rotational angle of the plate cam 21 (cam rotational angle).

The cam groove 22 of the plate cam 21 is a guide portion, which is configured into a curved form that corresponds to a moving pattern of the wastegate valve 1.

A cam shape of the plate cam 21 and a rotational angle of the plate cam 21 are determined for a required amount of stroke of the rod 4, which is required to drive the wastegate valve 1 from the full close position to the full open position.

The follower 23 is made of a metal material and is configured into a cylindrical tubular form. The follower 23 is rotatably fitted to an outer peripheral surface of the pivot pin 24. The follower 23 includes a cylindrical tubular portion, which surrounds the pivot pin 24 in a circumferential direction.

The pivot pin 24 is fitted into the fitting hole of the rod 4 and is thereby securely press-fitted to the rod 4. A flange, which is swaged into a collar form to limit removal of the follower 23, is formed in a projecting part of the pivot pin 24, which projects from an end surface of the cylindrical tubular portion of the follower 23.

A rotational center of the follower 23 and a rotational center of the plate cam 21 are located along the central axis (rod central axis) RC of the rod 4.

The electric motor M is a drive source of the electric actuator 300 and is received in a motor receiving space of the gear housing 26. The energization of the electric motor M is controlled by the ECU 400.

The ECU 400 includes a microcomputer of a known type, which includes a CPU, a ROM and a RAM. The ECU 400 controls an electric actuator of a throttle valve and the electric actuator 300 of the wastegate valve 1 based on output signals received from the stroke sensor S, a crank angle sensor, an accelerator opening degree sensor, a throttle opening degree sensor, a boost pressure sensor and a vehicle speed sensor.

Next, details of the stroke sensing device 303 will be described with reference to FIGS. 1 to 7B.

The stroke sensing device 303 includes the magnetic movable body 8 and the stroke sensor S. The magnetic movable body 8 is provided integrally with the rod 4. The stroke sensor S senses the stroke position of the magnetic movable body 8.

The ECU 400 has a function of a rod stroke sensing means for computing (sensing) the linear stroke position (amount of displacement) of the rod 4 of the electric actuator 300 based on the output value (sensor output value), which is outputted from the stroke sensor S as the electric signal.

The magnetic movable body 8 is provided integrally with, i.e., is installed integrally to the rod 4 to linearly move in response to the movement of the rod (serving as a sensing subject) 4 in the stroke direction. The magnetic movable body 8 includes first and second permanent magnets (hereinafter simply referred to as first and second magnets) 51, 52 and a magnetic frame (magnetic body) 50. The first and second magnets 51, 52 generate a generally parallel magnetic field having a generally constant density of the magnetic flux therebetween. The magnetic frame 50 is configured into an elongated rectangular frame and concentrates the magnetic flux (magnetic field) generated between the first and second magnets 51, 52 onto the stroke sensor S.

Each of the first and second magnets 51, 52 is configured into the rectangular parallelepiped form and generates the magnetic flux (magnetic field) directed to the stroke sensor S. Each of the first and second magnets 51, 52 is magnetized such that two opposed end parts of the magnet 51, 52, which are opposed to each other in a plate thickness direction of the magnet 51, 52 that is perpendicular to a longitudinal direction and a width direction of the magnet 51, 52, form the opposite polarities, i.e., the N-pole and the S-pole, respectively. Furthermore, each of the first and second magnets 51, 52 is magnetized to form a generally parallel magnetization pattern such that magnetic lines of force are generally parallel to each other. The first and second magnets 51, 52 are opposed to each other while a predetermined air gap is interposed between the first and second magnets 51, 52.

Each of the first and second magnets 51, 52 is magnetized in the direction, which is generally perpendicular to the central axis RC of the rod 4. The opposed magnetic pole surfaces of the first and second magnets 51, 52, which are opposed to each other, are magnetized to have the same polarity (e.g., the N-pole). Arrows, which are shown around the first and second magnets 51, 52 in FIG. 1, indicate directions of the lines of the magnetic flux generated at the magnetic pole surfaces of the first and second magnets 51, 52.

Thereby, the magnetization direction (plate thickness direction) of the first magnet 51 coincides with the direction, which is generally perpendicular to the central axis RC of the rod 4. Furthermore, the one side of the first magnet 51 (the upper side in FIG. 1) in the plate thickness direction of the first magnet 51 is the S-pole, and the other side of the first magnet 51 (the lower side in FIG. 1) in the plate thickness direction of the first magnet 51 is the N-pole. The magnetization direction (plate thickness direction) of the second magnet 52 coincides with the direction, which is generally perpendicular to the central axis of the rod 4. The one side of the second magnet 52 (the upper side in FIG. 1) in the plate thickness direction of the second magnet 52 is the N-pole, and the other side of the second magnet 52 (the lower side in FIG. 1) in the plate thickness direction of the second magnet 52 is the S-pole.

The magnetic frame (magnetic body) 50 is made of a magnetic material, such as iron, nickel, ferrite, which forms a closed magnetic path. The magnetic frame 50 includes upper and lower blocks (axially extending blocks, hereinafter referred to as blocks) 54, 55 and left and right blocks (perpendicularly extending blocks) 56, 57, which are integrated together. Each of the upper and lower blocks 54, 55 is configured into a rectangular parallelepiped form and extends in the longitudinal direction, i.e., extends in the direction generally parallel to the central axis RC of the rod 4. Each of the left and right blocks 56, 57 is configured into a rectangular parallelepiped form and extends in a transverse direction, i.e., extends in a direction generally perpendicular to the central axis RC of the rod 4. Furthermore, the magnetic frame 50 includes a plurality of brackets 59, which are fixed to a magnetic movable body mount surface of the first rod 31 of the rod 4 with screws 58 (e.g., fixing screws or fixing bolts).

Each of the upper and lower blocks 54, 55 has a magnet holding portion, and the magnet holding portion of the upper block 54 and the magnet holding portion of the lower block 55 are opposed to each other through the air gap. The first and second magnets 51, 52 are securely held at inner surfaces (opposed surfaces) of the magnet holding portions of the upper and lower blocks 54, 55 by a fixing means, such as bonding agent in such a manner that the pole surface (the S-pole) of each of the first and second magnets 51, 52 contacts the inner surface of the magnet holding portion of the corresponding block 54, 55.

Alternatively, the first and second magnets 51, 52 may be provided to the stroke sensor S side, and the magnetic movable body 8 may include only the magnetic frame 50.

The stroke sensor S is held by a sensor mounting portion (sensor holder) of the sensor cover of the actuator case 304 as follows. That is, the stroke sensor S is received in a sensor receiving space, which is surrounded by the magnetic movable body 8 such that the stroke sensor S is located in a middle of a magnetic circuit, which is formed by the first and second magnets 51, 52 and the magnetic frame 50. The stroke sensor S projects from the sensor mounting portion (sensor holder) of the sensor cover of the actuator case 304 toward the first rod 31 of the rod 4.

The stroke sensor S includes a Hall element that is a contactless magnetic sensing element, which senses the magnetic flux (a magnetic flux density, a magnetic field distribution, a magnetic field strength) that changes in response to the movement of the magnetic movable body 8 relative to the stroke sensor S in the stroke direction. The Hall element has a magnetic sensing surface F, which senses a magnetic flux density of the magnetic field, which is applied from the magnetic movable body 8, particularly the first and second magnets 51, 52 (from the N-pole).

The Hall element of the stroke sensor S is a main constituent component of a Hall IC. That is, the Hall IC has the Hall element and outputs an electric signal (a voltage signal, i.e., a sensor output signal, which will be hereinafter also referred to as a sensor output value) that corresponds to a density of the magnetic flux that passes the magnetic sensing surface F of the Hall element. The Hall IC is formed as an IC chip, in which the Hall element and an amplifier circuit are integrated. The Hall IC is placed in the sensor receiving space, which is configured into a rectangular shape and is located in the inside of the magnetic frame 50 of the magnetic movable body 8 to enable relative movement between the Hall IC and the magnetic movable body 8. In place of the Hall IC, the Hall element (s) alone or a magnetoresistive element(s) may be used as the contactless magnetic sensing element(s) of the stroke sensor S.

The magnetic circuit, which is formed by the magnetic movable body 8 and the stroke sensor S, is held as follows. That is, the magnetic movable body 8 is placed in a location, which is indicated with a solid line in FIG. 1, when the wastegate valve 1 is placed in the full close position. Furthermore, the magnetic movable body 8 is held in a location, which is indicated with a dot-dot-dash line in FIG. 1 and a solid line in FIG. 2, when the wastegate valve 1 is placed in the full open position.

The magnetic circuit includes first to fourth magnetic circuits. The first magnetic circuit is a closed magnetic circuit, which is formed by the first magnet 51, the Hall IC having the Hall element, the right block 57 and the upper block 54. The second magnetic circuit is a closed magnetic circuit, which is formed by the first magnet 51, the left block 56 and the upper block 54. The third magnetic circuit is a closed magnetic circuit, which is formed by the second magnet 52, the Hall IC having the Hall element, the right block 57 and the lower block 55. The fourth magnetic circuit is a closed magnetic circuit, which is formed by the second magnet 52, the left block 56 and the lower block 55.

At the stroke sensor S, in a case where the wastegate valve 1 is placed between the full close position and the full open position, the stroke position of the magnetic movable body 8 (a relative position of the magnetic movable body 8 relative to a reference position) and the amount of stroke of the rod 4 correspond with each other, and the stroke position of the rod 4 and the valve opening degree of the wastegate valve 1 correspond with each other. Therefore, the ECU 400 can obtain the amount of stroke of the rod 4 by measuring the stroke position of the rod 4 (thereby the stroke position of the magnetic movable body 8), i.e., by measuring the sensor output value, which is outputted in response to a change in the magnetic field. Then, the ECU 400 can obtain the valve opening degree of the wastegate valve 1 based on the thus obtained amount of stroke of the rod 4. Thereafter, the ECU 400 can obtain a flow quantity of the exhaust gas, which flows through the wastegate passage 9, based on the thus obtained valve opening degree of the wastegate valve 1.

Here, in the case where the stroke position of the magnetic movable body 8 is sensed with the Hall IC, the Hall element or the MR element in the contactless manner, when a magnetic material (e.g., iron) is placed adjacent to the first and second magnetic circuits, which are formed by the magnetic movable body 8 and the Hall IC of the stroke sensor S, the magnetic field, which is sensed with the contactless magnetic sensing element, may not be stably obtained in some cases. In view of the above point, in the electric actuator 300 of the present embodiment, the corresponding components (e.g., the rod 4, the final gear 18, the plate cam 21, the follower 23, the pivot pin 24 and the final gear shaft 15), which are placed adjacent to the first and second magnetic circuits, are made of a non-magnetic material (e.g., non-magnetic metal, such as stainless steel, or non-magnetic resin), so that the influence of the external disturbance on the first and second magnetic circuits is avoided or is alleviated.

Next, details of the link lever 3 and the rod 4 of the present embodiment will be described with reference to FIGS. 1 to 7B.

The first connection of the link lever 3 (the first hinge pin 11, which is the rod-side connection between the link lever 3 and the distal end part of the rod 4) is moved along a corresponding rotational moving path (a rotational moving path of the link lever 3 indicated by a dot-dash line in FIG. 1 or 2), which is a curved path that has a predetermined radius of curvature about the rotational axis of the link lever 3 (the rotational axis of the wastegate valve 1), when the wastegate valve 1 is moved, i.e., when the wastegate valve 1 is rotated from the full close position to the full open position, and vice versa.

More specifically, the rotational moving path, i.e., the curved path of the link lever 3 is an arcuate path (the imaginary circle indicated by the dot-dash line in FIG. 1 or 2), which extends along the arcuate line having the predetermined radius of curvature about the rotational axis O of the wastegate valve 1 (and thereby the rotational axis of the link lever 3 or the center of the hinge pin 12). The rotational moving path of the link lever 3 connects between a full close point A of the link lever 3 along the rotational moving path of the link lever 3 and a full open point B of the link lever 3 along the rotational moving path of the link lever 3. The full close point A is a point, at which a rotational moving point of the link lever 3 (the first hinge pin 11, which serves as the rod-side connection of the link lever 3) is located along the rotational moving path of the link lever 3 when the wastegate valve 1 is placed to have its full close degree. The full open point B is a point, at which the rotational moving point of the link lever 3 is located along the rotational moving path of the link lever 3 when the wastegate valve 1 is placed to have its full open degree.

Figure 4:
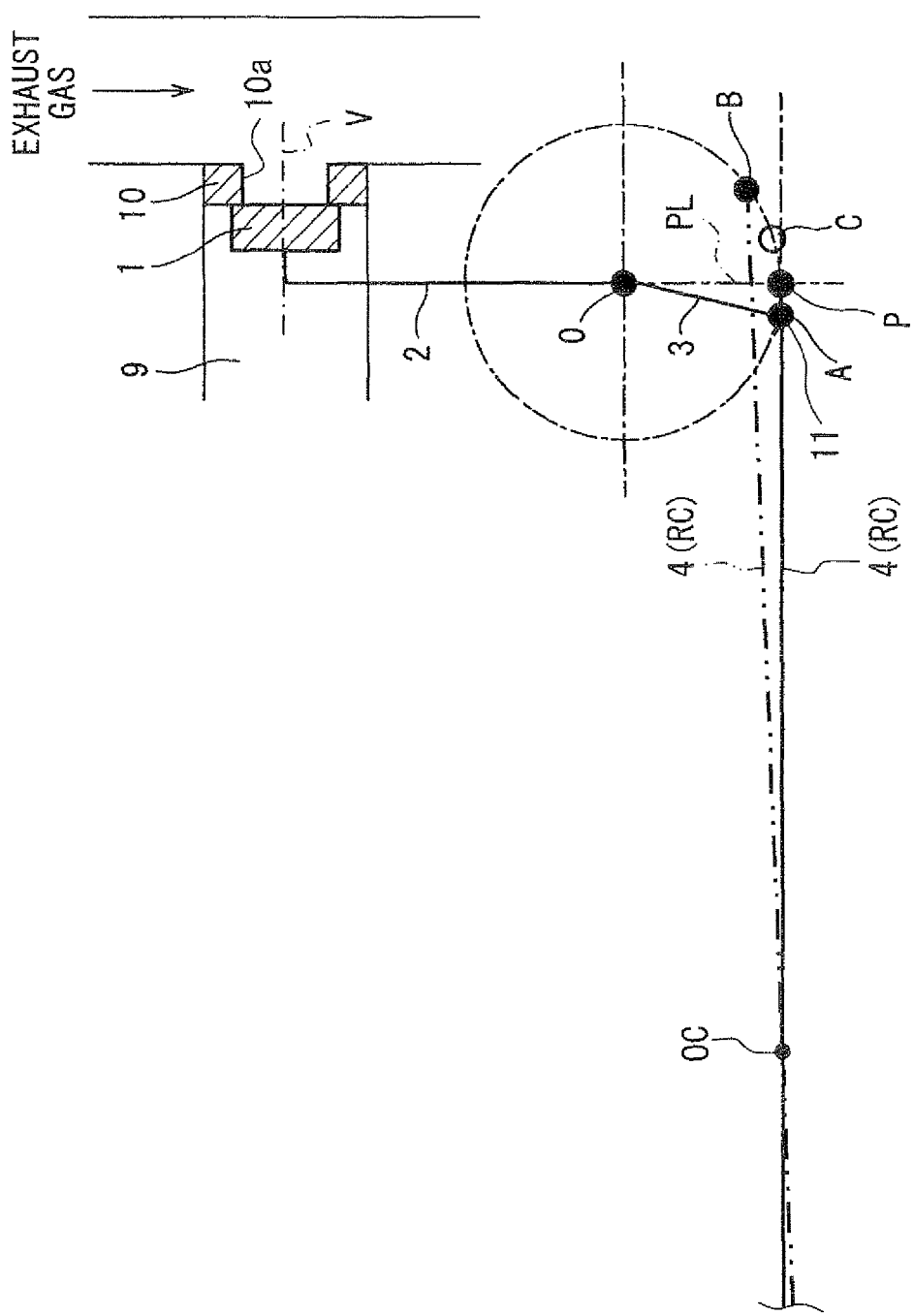
FIG. 4 is a schematic view showing a positional relationship between the link lever and a rod of the wastegate valve control apparatus according to the embodiment at the time of fully closing the wastegate valve.
Figure 6A:
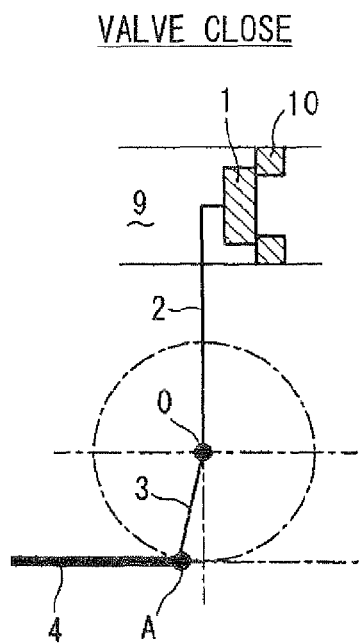
FIGS. 6A and 6B are schematic diagrams showing estimative lines, which indicate the amount of swing of the rod according to the embodiment.

The full close position of the wastegate valve 1 is a position of the wastegate valve 1, at which the wastegate valve 1 is placed to have its full close degree, so that the wastegate valve 1 seats against the valve seat 10 and thereby fully closes the wastegate passage 9, as shown in FIGS. 4 and 6A.

Figure 6B:
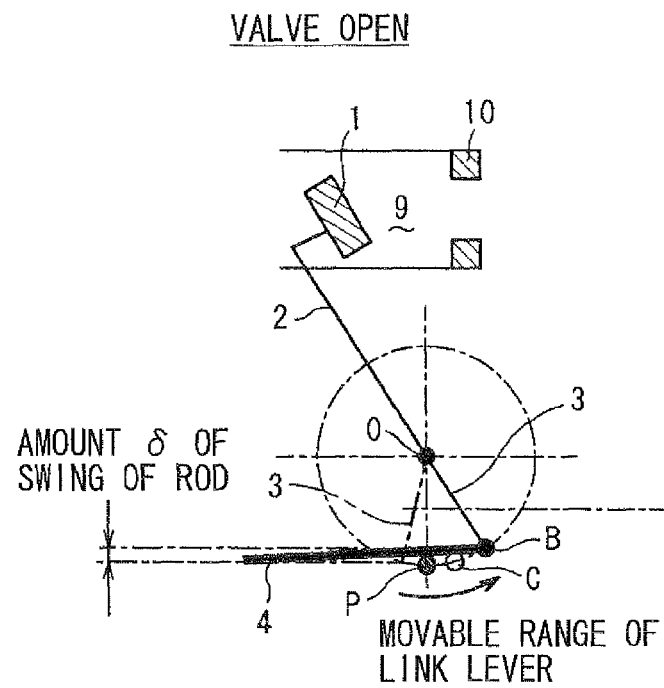

The full open position of the wastegate valve 1 is a position of the wastegate valve 1, at which the wastegate valve 1 is placed to have its full open degree, so that the wastegate valve 1 is spaced away from the valve seat 10 and thereby fully opens the wastegate passage 9, as shown in FIG. 6B.

Figure 7A:
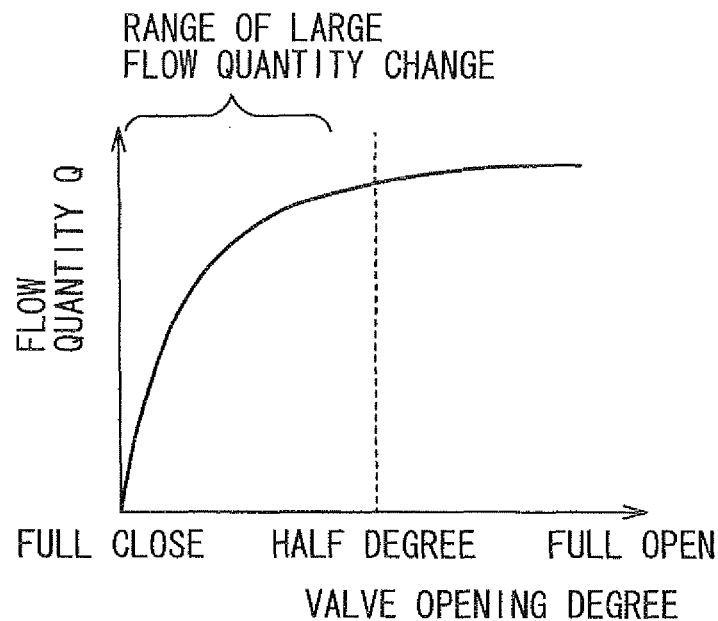
FIG. 7A is a diagram showing a change in a flow quantity relative a change in an opening degree of the wastegate valve according to the embodiment.
Figure 7B:
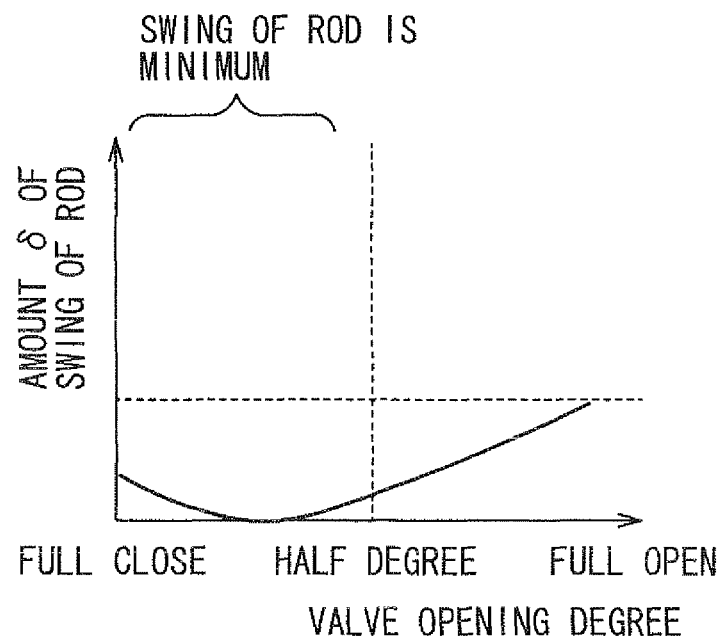
FIG. 7B is a diagram showing a change in the amount of swing of the rod relative to the change in the opening degree of the wastegate valve according to the embodiment.
Figure 8:
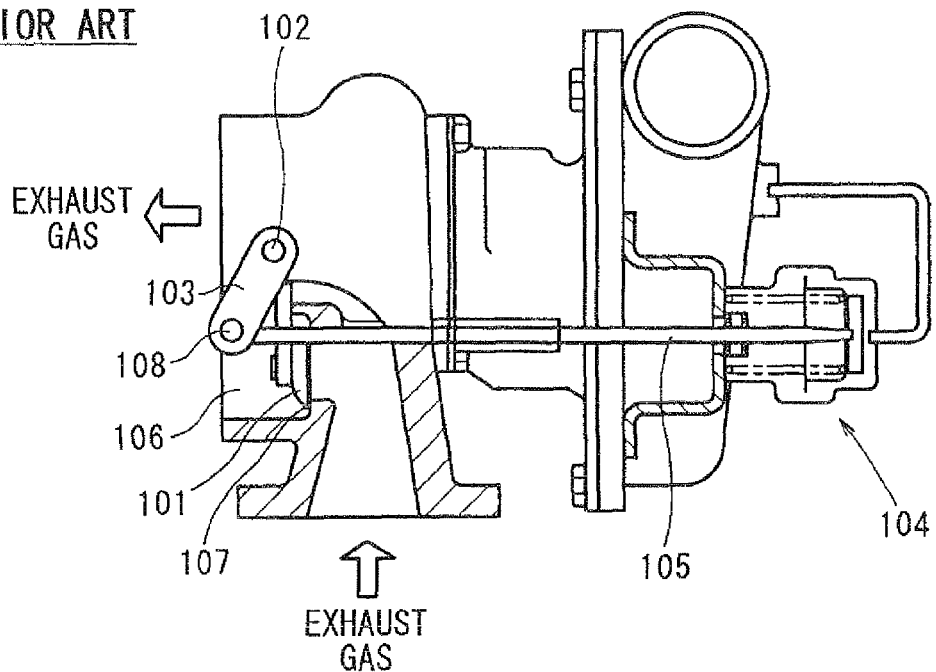
FIG. 8 is a partial cross-sectional view of a boost pressure control apparatus having a wastegate valve according to a first prior art.
Figure 9A:
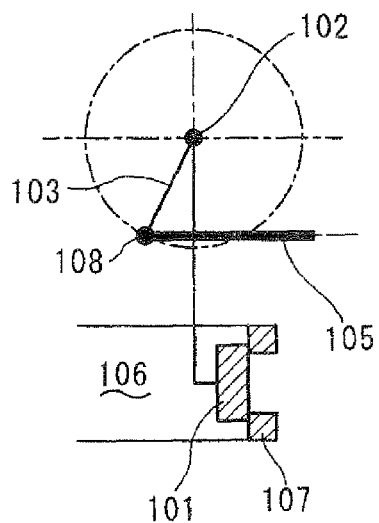
FIGS. 9A and 9B are schematic diagrams showing estimative lines, which indicate the amount of swing of the rod in the first prior art.
Figure 9B:
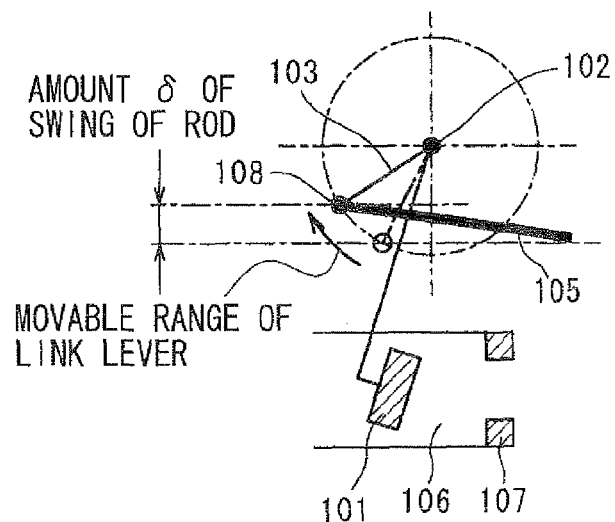
Figure 10A:
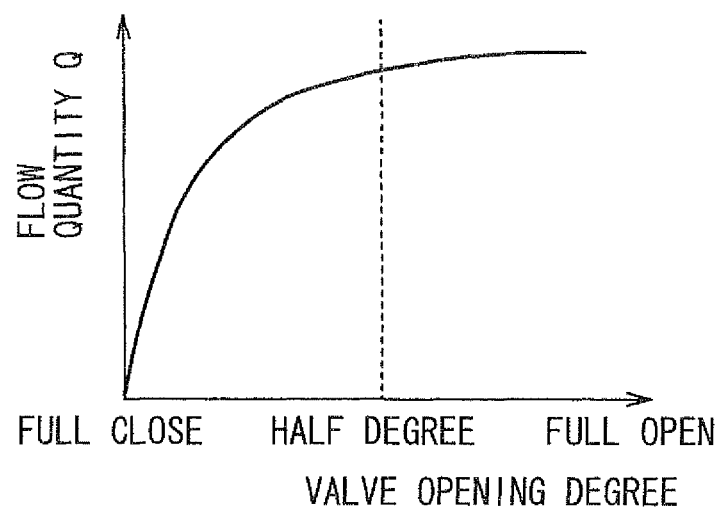
FIG. 10A is a diagram showing a change in a flow quantity relative a change in an opening degree of the wastegate valve in the first prior art.
Figure 10B:
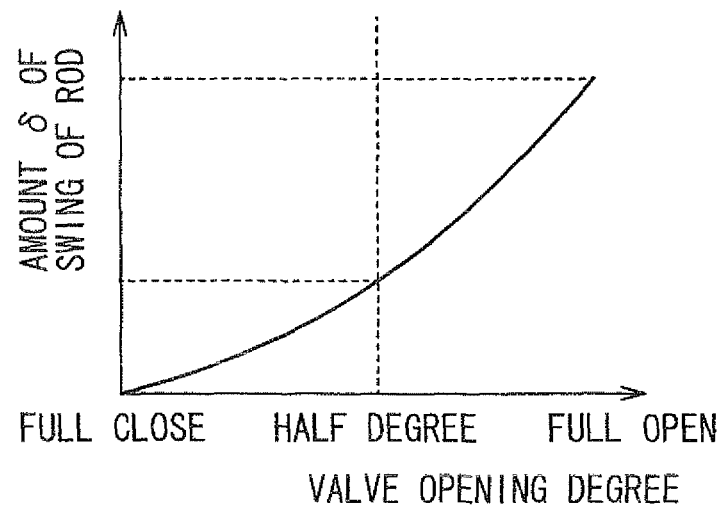
FIG. 10B is a diagram showing a change in the amount of swing of the rod relative to the change in the opening degree of the wastegate valve in the first prior rat.
Figure 11:
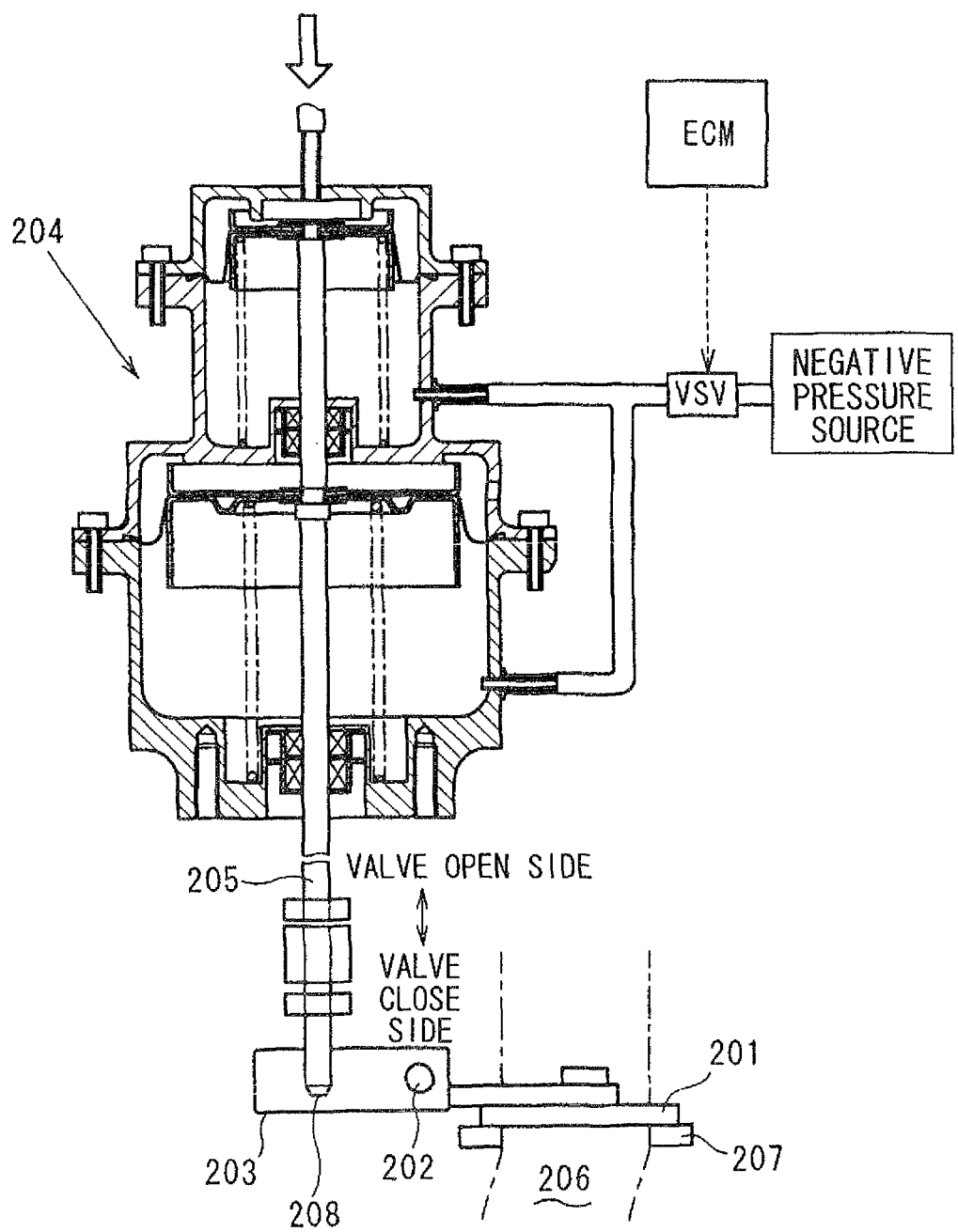
FIG. 11 is a cross-sectional view of a diaphragm actuator of a second prior art, which drives an exhaust gas bypass valve.
Figure 12A:
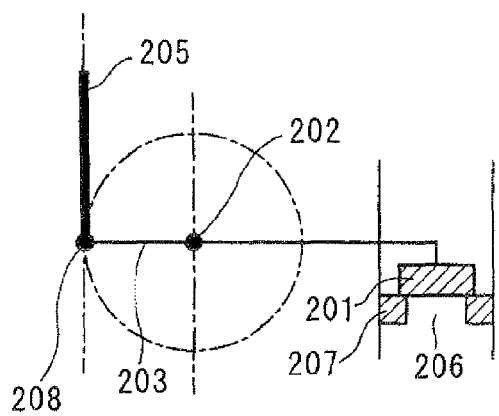
FIGS. 12A and 12B are schematic diagrams showing estimative lines, which indicate the amount of swing of the rod in the second prior art.
Figure 12B:
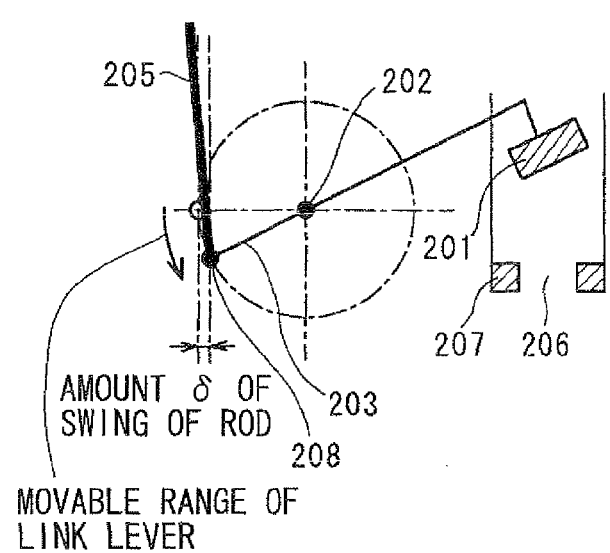
Figure 13A:
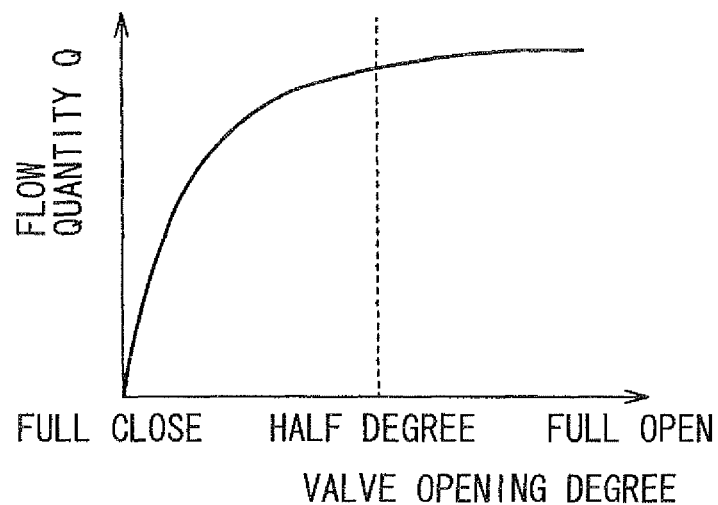
FIG. 13A is a diagram showing a change in a flow quantity relative a change in an opening degree of the exhaust gas bypass valve in the second prior art.
Figure 13B:
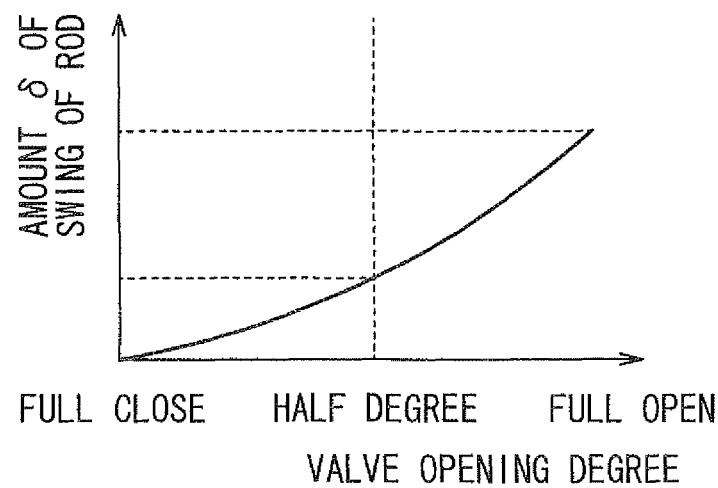
FIG. 13B is a diagram showing a change in the amount of swing of the rod relative to the change in the opening degree of the exhaust gas bypass valve in the second prior rat.

Furthermore, a half opening degree (or simply referred to as a half degree) of the wastegate valve 1 shown in FIGS. 7A and 7B is a median (midpoint) between the full close degree and the full open degree of the wastegate valve 1.

In the present embodiment, with reference to FIG. 4, when the opening degree of the wastegate valve 1 becomes the full close degree, the rotational moving point of the link lever 3 along the rotational moving path of the link lever 3 is in the full close point A.

Furthermore, when the opening degree of the wastegate valve 1 becomes the full open degree, the rotational moving point of the link lever 3 along the rotational moving path of the link lever 3 is in the full open point B.

Furthermore, when the opening degree of the wastegate valve 1 becomes the half degree (the opening degree at the midpoint between the full open degree and the full close degree), the rotational moving point of the link lever 3 along the rotational moving path of the link lever 3 is in a half point C.

Figure 5:
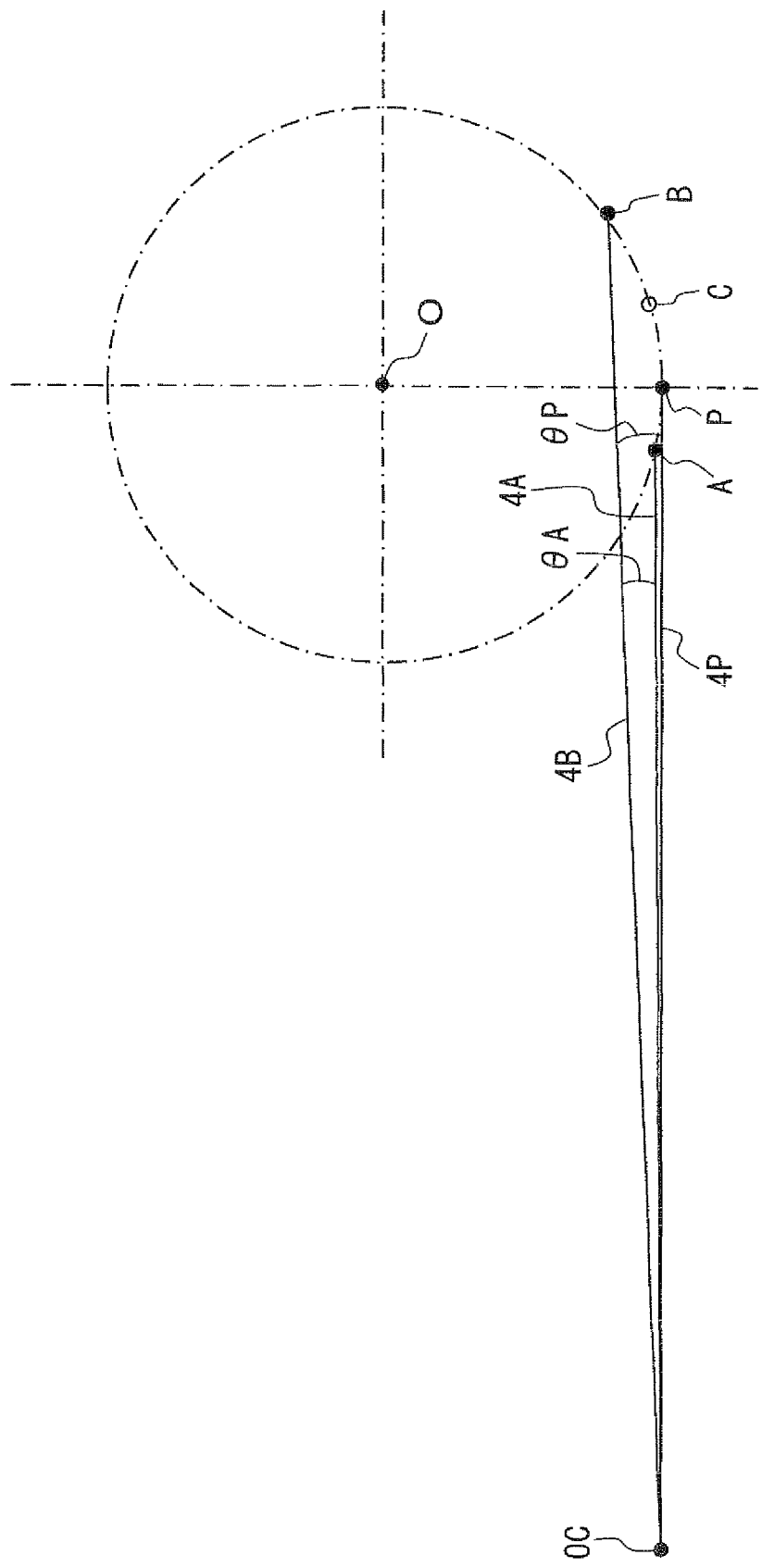
FIG. 5 is a schematic diagram showing various operational positions of the first hinge pin of the wastegate valve control apparatus according to the embodiment.

With reference to FIGS. 4 and 5, when the rod 4 is swung, the rotational moving point of the link lever 3 (the rod-side connection of the link lever 3) is also swung between the full close point A and the full open point B along the rotational moving path, and an apex P of this swing along the rotational moving path is set at a point, which is located between the full close point A and the half point C along the rotational moving path and satisfies a relationship of θP>θA. Here, θP denotes an angle that is defined between a first imaginary line 4B, which connects between the bearing center OC of the rod bearing 5 and the full open point B, and a second imaginary line 4P, which connects between the bearing center OC and the apex P of the swing. Furthermore, θA denotes an angle that is defined between the first imaginary line 4B and a third imaginary line 4A, which connects between the bearing center OC and the full close point A. The first imaginary line 4B coincides with the central axis RC of the rod 4 upon placement of the rod-side connection (first hinge pin 11) of the link lever 3 at the full open point B. The second imaginary line 4P coincides with the central axis RC of the rod 4 upon placement of the rod-side connection (first hinge pin 11) of the link lever 3 at the apex P of the swing. The third imaginary line 4A coincides with the central axis RC of the rod 4 upon placement of the rod-side connection (first hinge pin 11) of the link lever 3 at the full close point A. The angle θP is the largest possible angle, which can be defined between the first imaginary line 4B and any other possible imaginary line, which coincides with the central axis RC of the rod 4 at any point between the full open point B and the full close point A along the rotational moving path. Therefore, the apex P of the swing can be considered as a point, at which the largest angle θP can be defined in the swing range between the full open point B and the full close point A along the rotational moving path. In the present instance, the apex P of the swing is a bottom extreme point in the swing range between the full close point A and the full open point B, as shown in FIGS. 4 to 6B and 7B.

Furthermore, with reference to the schematic view of FIG. 4, the shaft 2 of the wastegate valve 1 extends along a primary imaginary line, which is a straight line (see the straight line of the shaft 2 that represents the central axis of the shaft 2) that extends though the rotational axis O of the link lever 3. The link lever 3 extends along a secondary imaginary line (see the straight line of the link lever 3 that represents the central axis O of the link lever 3), which is a straight line that extends through the rotational axis O of the link lever 3. The second imaginary line defines an obtuse angle relative to the first imaginary line on one circumferential side (left side in FIG. 4) of the apex P of the swing where the full close point A is located along the rotational moving path.

When the operational moving points of the link lever 3 along the rotational moving path of the link lever 3 are set in the above described manner, the apex P of the swing along the rotational moving path of the link lever 3 is placed between the full close point A and the half point C, particularly is placed generally in a median (midpoint) between the full close point A and the half point C.

When the operational moving point of the link lever 3 is placed in the apex P of the swing along the rotational moving path of the link lever 3, a straight line (see the dot-dash line indicating an imaginary plane PL discussed below), which connects between the rotational axis O of the link lever 3 (the rotational center of the link lever 3) and the apex P of the swing along the rotational moving path of the link lever 3, generally defines the right angle (90 degrees) relative to the central axis RC of the rod 4 of the electric actuator 300. Furthermore, in this instance, the apex P of the swing is located in the imaginary plane PL of FIG. 4 that is generally perpendicular to a central axis V of the opening 10a of the valve seat 10 and extends through the rotational axis O of the link lever 3 (the rotational axis of the valve 1). The rotational moving path of the rod-side connection of the link lever 3 is generally perpendicular to this imaginary plane PL.

As discussed above, the rotational moving path of the link lever 3 is the arcuate path (the imaginary circle indicated by the dot-dash line in FIG. 3), which extends along the curved line (arcuate line) having the predetermined radius of curvature about the rotational axis of the link lever 3 (and thereby the rotational axis of the wastegate valve 1). An arrow shown in FIG. 6B indicates a movable range of the link lever 3 (rotatable angular range of the link lever 3).

Next, the operation of the electric actuator 300, which controls the opening and closing of the wastegate valve 1, will be briefly described with reference to FIGS. 1 to 7B.

In the case where the boost pressure, which is sensed with the boost pressure sensor, is smaller than a predetermined value, the supply of the electric power to the electric motor M is controlled by the ECU 400 to place the wastegate valve 1 into the full close state where the wastegate valve 1 has the full close degree.

In this way, the components of the electric actuator 300 are stopped in the full close state, so that the wastegate valve 1 maintains the full close state (full close degree). In this way, the wastegate passage 9 is closed. Thus, the entire amount of exhaust gas, which is outputted from the engine, is supplied into the inlet of the turbine housing 7 of the turbocharger to rotate the turbine impeller and is thereafter discharged from the outlet of the turbine housing 7.

The intake air, which is drawn into the intake pipe, is compressed by the compressor impeller driven through the rotation of the turbine impeller, so that the pressure (boost pressure) of the intake air is increased. The pressurized intake air is then drawn into the engine.

In a case where the boost pressure, which is sensed with the boost pressure sensor, is increased equal to or larger than the predetermined value, i.e., the boost pressure exceeds a predetermined maximum boost pressure, the supply of the electric power to the electric motor M is controlled by the ECU 400 to place the wastegate valve 1 in the full open state.

In this way, the motor shaft 13 of the electric motor M is rotated in a full open direction. Thereby, the motor torque is conducted to the pinion gear 16, the intermediate gear 17 and the final gear 18. The plate cam 21, to which the motor torque is conducted from the final gear 18, is rotated in the full open direction by a predetermined rotational angle (a rotational angle equal to the operational angle of the final gear 18) in response to the rotation of the final gear 18.

Then, the pivot pin 24 slides along the cam groove 22 to move from the full close position to the full open position, so that the first rod 31 of the rod 4 is linearly moved (pushed) toward the valve open side in the stroke direction of the rod 4 while compressing the coil spring 6. Thereby, the first rod 31, the second rod 32 and the connecting rod 33 are linearly moved toward the valve open side in the stroke direction of the rod 4.

Furthermore, the first hinge pin 11 is linearly moved toward the valve open side in the stroke direction of the rod 4 in response to the linear movement of the second rod 32, so that the link lever 3 is rotated in the full open direction about the second hinge pin 12. At this time, the wastegate valve 1 is rotated toward the full open direction about the second hinge pin 12 in response to the rotation of the second hinge pin 12. In this way, the wastegate valve 1 is lifted away from the valve seat and is placed in the full open state, so that the wastegate passage 9 is opened.

Thereby, a portion of the exhaust gas, which is supplied from the engine into the inlet of the turbine housing 7, flows through the wastegate passage 9, which bypasses the turbine impeller, and then this exhaust gas is discharged through the wastegate passage 9 through the outlet of the turbine housing 7. In this way, the exhaust gas energy, which is applied to the turbine impeller, is reduced, and thereby the rotational speed of the turbine impeller is reduced. Thus, the excessive rotation of the turbocharger is limited.

Furthermore, the boost pressure or exhaust gas pressure does not become excessive. In addition, a damage of the turbine impeller, which would be caused by excessive rotation of the turbine impeller, is limited.

In the case where the boost pressure, which is sensed with the boost pressure sensor, is decreased below the predetermined value, the supply of the electric power to the electric motor M is controlled by the ECU 400 to place the wastegate valve 1 into the full close state.

In this way, the motor shaft 13 of the electric motor M is rotated in a full close direction. Thereby, the motor torque is conducted to the pinion gear 16, the intermediate gear 17, the final gear 18 and the plate cam 21. Thus, the plate cam 21 is rotated by a predetermined angular range in the full close direction in response to the rotation of the final gear 18.

Then, the pivot pin 24 slides along the cam groove 22 to move from the full open position to the full close position, so that the rod 4 is linearly moved (pulled) toward the valve close side in the stroke direction of the rod 4. Thereby, the first rod 31, the second rod 32 and the connecting rod 33 are linearly moved toward the valve close side in the stroke direction of the rod 4.

Furthermore, the first hinge pin 11 is linearly moved toward the valve close side in the stroke direction of the rod 4 in response to the linear movement of the second rod 32, so that the link lever 3 is rotated in the full close direction about the second hinge pin 12. At this time, the wastegate valve 1 is rotated toward the full close direction about the second hinge pin 12 in response to the rotation of the second hinge pin 12. In this way, the wastegate valve 1 is seated against the valve seat 10 and is placed in the full close state, so that the wastegate passage 9 is closed.

Furthermore, the wastegate valve 1 may be controlled and may be thereby set to the intermediate opening degree (half degree) between the full close degree (full close position) and the full open degree (full open position) based on the operational state of the engine, particularly the boost pressure, which is sensed with the boost pressure sensor. In this case, the valve opening degree of the wastegate valve 1 is changed in a linear manner or stepwise manner based on the boost pressure, so that the flow quantity of the exhaust gas, which passes through the wastegate passage 9, can be finely adjusted in a linear manner or stepwise manner. Thereby, the boost pressure of the engine can be variably controlled in a linear manner or stepwise manner.

Now, a first characteristic of the present embodiment will be described.

As discussed above, in the wastegate valve control apparatus of the present embodiment, the link mechanism 500, which converts the linear motion of the rod 4 into the rotational motion of the wastegate valve 1, is provided between the shaft 2 of the wastegate valve 1 and the rod 4 of the electric actuator 300. Furthermore, in the electric actuator 300, the magnetic movable body 8 is provided integrally with the rod 4, which is connected to the wastegate valve 1 through the link lever 3.

The stroke position of the magnetic movable body 8, which is moved integrally with the first rod 31 of the rod 4, is sensed with the Hall IC of the stroke sensor S. Thereby, the stroke position of the rod 4, which is the final operational stage of the electric actuator 300 in the force transmission path, can be directly sensed. Therefore, the sensing accuracy of the stroke position of the rod 4 can be improved, so that the controllability of the amount of the stroke of the rod 4, i.e., the controllability of the opening degree of the wastegate valve 1 can be improved.

Furthermore, in a case where the stroke position of the magnetic movable body 8, which is sensed with the Hall IC of the stroke sensor S, does not reach or approach the target position upon elapsing of a predetermined time period, it may be determined that a failure of the rod 4 or any other component(s) of the electric actuator 300 (e.g., an inoperable state of the wastegate valve 1 or the rod 4) exists. That is, the failure diagnosis of the wastegate valve 1, the rod 4 or any other component(s) of the electric actuator 300 can be performed. In this way the OBD requirement can be met.

Now, a second characteristic of the first Embodiment will be described.

Furthermore, in the wastegate valve control apparatus of the present embodiment, when the wastegate valve 1 is rotated (opened or closed), the connection of the link lever 3 (the first hinge pin 11, which is the connection between the link lever 3 and the rod 4 of the electric actuator) is moved along the rotational moving path, which is the arcuate curved line (arcuate path) that connects between the full close point A and the full open point B.

Here, the rotational moving points along the rotational moving path of the link lever 3 are set to include the full close point A along the rotational moving path of the link lever 3, the full open point B along the rotational moving path of the link lever 3, the half point C along the rotational moving path of the link lever 3 and the apex P of the swing along the rotational moving path of the link lever 3.

When the operational moving points of the link lever 3 along the rotational moving path of the link lever 3 are set in the above described manner, the apex P of the swing along the rotational moving path of the link lever 3 is placed between the full close point A and the half point C, particularly, is placed generally at the median (midpoint) between the full close point A and the half point C.

As discussed above, in the wastegate valve control apparatus of the present embodiment, the apex P of the swing along the rotational moving path of the link lever 3 is placed between the full close point A and the half point C at the time of rotating (opening or closing) the wastegate valve 1. Therefore, in comparison to the prior art technique of Japanese Unexamined Patent Publication No. H10-103069A and prior art technique of Japanese Unexamined Patent Publication No. 2010-90766A, it is possible to reduce the amount of swing of the rod 4 (rod axis swing amount δ) of the electric actuator 300, as show in FIG. 6B. In this way, the sensing error, which would be caused by the swing of the rod 4, can be made small at the time of directly sensing the amount of the stroke of the rod 4.

Furthermore, the apex P of the swing along the rotational moving path of the link lever 3 is placed generally in the midpoint between the full close point A and the half point C, as discussed above. Therefore, as shown in FIGS. 7A and 7B, the amount of the swing of the rod 4 (the amplitude of the swing of the rod 4 per unit rotational angle of the link lever 3) can be minimized in a low opening degree range (a range located on the full close degree side of the half degree) where a rate of change in the flow quantity (or the pressure) Q of the exhaust gas relative to a change in the amount of the displacement (the amount of the stroke) of the rod 4 in the stroke direction thereof is largest. In other words, the amount of the swing of the rod 4 (the amplitude of the swing of the rod 4 per unit rotational angle of the link lever 3) can be minimized in the range between the full close point A and the half degree C, where the high sensing accuracy is required. In this way, the sensing accuracy and the controllability of the amount of the stroke of the rod 4 with the stroke sensor S can be improved.

Now, a third characteristic of the present embodiment will be described.

Furthermore, in the wastegate valve control apparatus of the present embodiment, the straight line, which connects between the rotational axis (rotational center) O of the link lever 3 and the apex P of the swing along rotational moving path of the link lever 3, generally defines the right angle (90 degrees) relative to the central axis RC of the rod 4 of the electric actuator 300. In this way, the amplitude of the swing of the rod 4 can be minimized. Thereby, the sensing error, which would be caused by the swing of the rod 4, can be made small at the time of directly sensing the amount of the stroke of the rod 4. Also, the sensing accuracy and the controllability of the amount of the stroke of the rod 4 with the stroke sensor S can be improved.

Furthermore, the electric actuator 300 includes the thrust bearing 5, which slidably supports the rod 4 to enable the slide motion of the rod 4 in the axial direction (stroke direction) of the rod 4 while enabling the swing motion of the rod 4 about the thrust bearing 5. As discussed above, the apex P of the swing along the rotational moving path of the link lever 3 is placed between the full close point A and the half point C. Therefore, the amount of the swing of the rod 4 can be minimized. Thus, it is possible to reduce disadvantageous possibilities, such as a possibility of applying the large force to the thrust bearing 5, a possibility of grinding of the rod 4 against the inner peripheral part of the thrust bearing 5, a possibility of localized wearing at the connection between the rod 4 and the thrust bearing 5, and a possibility of encountering the operational failure of the rod 4.

Now, modifications of the above embodiment will be described.

In the above embodiment, the valve control apparatus of the present invention is implemented as the wastegate valve control apparatus, which controls the electric actuator 300 that drives the wastegate valve 1. Alternatively, the valve control apparatus of the present invention may be implemented as a valve control apparatus, which controls an electric actuator that drives a valve element (valve) of an exhaust gas temperature control valve, and this exhaust gas temperature control valve controls (adjusts) a ratio between a quantity of exhaust gas recirculation (EGR) gas, which passes through an EGR cooler, and a quantity of EGR gas, which bypasses the EGR cooler.

In the above embodiment, the actuator is the electric actuator 300 used to drive the wastegate valve 1 by reciprocating the rod 4, which is connected to the wastegate valve 1 through the link lever 3, in the axial direction (the stroke direction) through use of the drive force of the electric motor M. Alternatively, this actuator may be replaced with a solenoid actuator or a hydraulic actuator, which uses an electromagnetic force or a hydraulic force to reciprocate a rod connected to the valve through a lever in an axial direction (stroke direction).

Furthermore, besides the wastegate valve 1, the present invention may be implemented in a valve control apparatus, which controls opening and closing of a valve element (valve) of a fluid control valve that controls fluid, which flows in a flow passage.

Furthermore, the engine is not limited to the diesel engine. That is, the engine may be a gasoline engine, if desired.

Additional advantages and modifications will readily occur to those skilled in the art. The invention in its broader terms is therefore not limited to the specific details, representative apparatus, and illustrative examples shown and described.

What is claimed is:

1. A valve control apparatus comprising:
   a valve that is adapted to open or close a flow passage;
   an actuator that includes a rod and a rod bearing and drives the rod to reciprocate the rod and to drive the valve through the rod, wherein the rod bearing slidably supports the rod to enable slide motion of the rod in an axial direction while enabling swing motion of the rod about a bearing center of the rod bearing;
   a link mechanism that includes a lever, which connects between the valve and the rod and converts linear motion of the rod into rotational motion of the valve; and
   means for sensing an amount of displacement of the rod in the axial direction of the rod, wherein:
   the actuator is driven to control opening and closing of the valve based on the amount of displacement of the rod in the axial direction of the rod, which is sensed by the sensing means;
   the lever includes a rotational axis, which is coaxial with a rotational axis of the valve, at a valve-side connection of the lever that is rotatably connected to the valve;
   the lever includes a rod-side connection that is rotatably connected to the rod, wherein a rotational moving point of the rod-side connection is adapted to swing between a full close point and a full open point along a rotational moving path, which is a curved path centered at the rotational axis of the valve-side connection of the lever and has a predetermined radius of curvature;
   when an opening degree of the valve becomes a full close degree to fully close the flow passage, the rotational moving point of the rod-side connection, which is moved along the rotational moving path, is placed in the full close point along the rotational moving path;
   when the opening degree of the valve becomes a full open degree to fully open the flow passage, the rotational moving point of the rod-side connection, which moves along the rotational moving path, is placed in the full open point along the rotational moving path;
   when the opening degree of the valve becomes a half degree, which is one half of an angular degree between the full close degree and the full open degree, the rotational moving point of the rod-side connection is placed in a half point between the full close point and the full open point along the rotational moving path;
   an apex of swing of the rotational moving point of the rod-side connection, which is adapted to swing between the full close point and the full open point along the rotational moving path, is set at a point, which is located between the full close point and the half point along the rotational moving path and satisfies a relationship of $\theta P > \theta A$ where:
   $\theta P$ denotes an angle that is defined between a first imaginary line, which connects between the bearing center and the full open point, and a second imaginary line, which connects between the bearing center and the apex of the swing; and
   $\theta A$ denotes an angle that is defined between the first imaginary line and a third imaginary line, which connects between the bearing center and the full close point.

2. The valve control apparatus according to claim 1, wherein the valve is an exhaust gas control valve, which controls a flow of exhaust gas outputted from an internal combustion engine.

3. The valve control apparatus according to claim 1, wherein the rotational moving path is an arcuate path, which connects between the full close point and the full open point and is centered at the rotational axis of the valve or the rotational axis of the valve-side connection of the lever and has the predetermined radius of curvature.

4. The valve control apparatus according to claim 1, wherein the apex of the swing is located generally at a midpoint between the full close point and the half point along the rotational moving path.

5. The valve control apparatus according to claim 1, wherein the actuator includes:
   an electric motor that is rotated upon energization thereof;
   a speed reducing mechanism that reduces a speed of rotation outputted from the electric motor; and
   a converting mechanism that converts rotational motion of the speed reducing mechanism into the linear motion of the rod.

6. The valve control apparatus according to claim 5, wherein the speed reducing mechanism includes:
   a driving-side gear that is rotated by the electric motor upon rotation of the electric motor; and
   a final gear that is meshed with the driving-side gear and is driven by the driving-side gear.

7. The valve control apparatus according to claim 5, wherein:
   the converting mechanism includes:
      a cam that is rotated by the speed reducing mechanism and has a cam groove, which is configured to correspond with a moving pattern of the valve; and
      a follower that is movably received in the cam groove;
   the rod includes a support shaft, which rotatably supports the follower;
   one end part of the rod is connected to the cam through the follower and the support shaft; and
   the other end part of the rod is connected to the valve.

8. The valve control apparatus according to claim 1, wherein the sensing means includes:
   a magnetic movable body that is installed integrally to the rod and includes at least one magnet to generate a magnetic field having a generally constant density of a magnetic flux; and
   a sensor that outputs an electric signal, which corresponds to the magnetic flux that changes in response to movement of the magnetic movable body in the axial direction relative to the sensor.

9. The valve control apparatus according to claim 8, wherein the sensing means senses the amount of displacement of the rod based on the electric signal outputted from the sensor.

10. The valve control apparatus according to claim 8, wherein the sensor includes a magnetic sensing surface, which is adapted to sense the magnetic flux of the magnetic field generated by the magnetic movable body.

11. The valve control apparatus according to claim 1, further comprising a valve seat that is provided in the flow passage, wherein:
    the valve is seated against the valve seat when the opening degree of the valve becomes the full close degree;
    the valve seat defines an opening therein to conduct fluid therethrough in the flow passage;
    the apex of the swing is located in an imaginary plane, which is generally perpendicular to a central axis of the opening of the valve seat and extends through the rotational axis of the valve; and
    the rotational moving path of the rod-side connection of the lever is generally perpendicular to the imaginary plane.

12. The valve control apparatus according to claim 1, wherein:

the valve includes a shaft, which extends along a primary imaginary line, which is a straight line that extends though the rotational axis of the lever;

the lever extends along a secondary imaginary line, which is a straight line that extends through the rotational axis of the lever; and the second imaginary line defines an obtuse angle relative to the first imaginary line on one circumferential side of the apex of the swing where the full close point is located along the rotational moving path.

* * * * *